(12) United States Patent
Feke

(10) Patent No.: US 10,725,243 B2
(45) Date of Patent: Jul. 28, 2020

(54) STABILIZED BROADBAND LIGHT SOURCE APPARATUS AND METHODS

(71) Applicant: The Charles Stark Draper Laboratory, Inc., Cambridge, MA (US)

(72) Inventor: Gilbert D. Feke, Windham, NH (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/965,087

(22) Filed: Apr. 27, 2018

(65) Prior Publication Data

US 2018/0314007 A1 Nov. 1, 2018

Related U.S. Application Data

(60) Provisional application No. 62/491,098, filed on Apr. 27, 2017.

(51) Int. Cl.
*G02B 6/26* (2006.01)
*G02B 6/27* (2006.01)
(Continued)

(52) U.S. Cl.
CPC ......... *G02B 6/2706* (2013.01); *G01C 19/721* (2013.01); *G02B 6/29325* (2013.01);
(Continued)

(58) Field of Classification Search
CPC .............. G02B 6/2746; G02B 6/29389; G02B 6/2706; G02B 6/29325; G02B 6/29352;
(Continued)

(56) References Cited

U.S. PATENT DOCUMENTS 3,327,243 A 6/1967 Stickley
3,361,990 A 1/1968 Gordon et al.
(Continued)

OTHER PUBLICATIONS

Gaiffe, T.P., "Wavelength stabilization of an erbium-doped fiber source with a fiber Bragg grating for high-accuracy FOG," SPIE's International Symposium on Optical Science, 375-380 (1996).
(Continued)

*Primary Examiner* — Ellen E Kim
(74) *Attorney, Agent, or Firm* — Hamilton, Brook, Smith & Reynolds, P.C.

(57) ABSTRACT

A broadband light source apparatus, and corresponding method, includes a broadband light source configured to provide source light with a source wavelength spectrum having a centroid thermal sensitivity. The apparatus also includes a broadband optical filter characterized by a filter spectrum that has one or more spectral characteristics and a thermal sensitivity with magnitude and sign. The filter is configured to receive the source light and to deliver broadband output light with an output spectrum that is a function of the source and filter spectra and has an output centroid wavelength. The spectral characteristics and the magnitude and sign of the thermal sensitivity of the filter are configured to minimize a thermal sensitivity of the output centroid wavelength. The filter can be configured in view of a particular source spectrum to stabilize output centroid wavelength and maximize total output power passively with respect to ambient temperature fluctuations.

13 Claims, 28 Drawing Sheets

(51) Int. Cl.
  *G02B 6/293* (2006.01)
  *G01C 19/72* (2006.01)
  *H04B 10/572* (2013.01)
  *G02B 27/28* (2006.01)
  *G02F 1/01* (2006.01)
  *G02F 1/09* (2006.01)

(52) U.S. Cl.
  CPC ..... *G02B 6/29352* (2013.01); *G02B 6/29389* (2013.01); *G02B 27/288* (2013.01); *G02F 1/0136* (2013.01); *G02F 1/09* (2013.01); *H04B 10/572* (2013.01); *G02B 6/2746* (2013.01); *G02B 6/29398* (2013.01); *G02F 2203/21* (2013.01)

(58) Field of Classification Search
  CPC . G01C 19/721; G02F 2203/21; G02F 1/0136; G02F 1/09; H04B 10/572
  See application file for complete search history.

(56) References Cited

U.S. PATENT DOCUMENTS

| | | | |
|---|---|---|---|
| 3,962,578 | A | 6/1976 | Roschen |
| 4,309,604 | A | 1/1982 | Yoshikawa et al. |
| 4,887,900 | A | 12/1989 | Hall |
| 5,177,562 | A | 1/1993 | Wysocki et al. |
| 5,313,480 | A | 5/1994 | Fidric |
| 5,875,203 | A * | 2/1999 | Wagener ............ H01S 3/06795 372/6 |
| 6,097,743 | A | 8/2000 | Alphonse |
| 6,108,086 | A | 8/2000 | Michal et al. |
| 6,144,788 | A | 11/2000 | Ang |
| 6,169,832 | B1 * | 1/2001 | McLandrich ...... G02B 6/29332 372/6 |
| 6,212,323 | B1 | 4/2001 | Harpin |
| 6,347,007 | B1 * | 2/2002 | Grubb ................. H01S 3/10023 359/337.2 |
| 6,373,048 | B1 | 4/2002 | Tschanun |
| 6,400,870 | B1 * | 6/2002 | Hill ...................... G02B 6/2821 385/3 |
| 6,429,965 | B1 | 8/2002 | Falquier et al. |
| 6,483,628 | B1 | 11/2002 | Digonnet |
| 6,510,004 | B1 | 1/2003 | Wu |
| 6,563,970 | B1 * | 5/2003 | Bohnert ................ G01L 9/0007 385/13 |
| 6,678,293 | B2 | 1/2004 | Colace et al. |
| 6,744,793 | B2 | 6/2004 | Stoner et al. |
| 6,859,471 | B2 | 2/2005 | Gregory |
| 6,931,034 | B2 * | 8/2005 | Khazaei ................... H01S 3/067 372/102 |
| 7,119,324 | B2 * | 10/2006 | Voigt .................... G01C 19/721 250/227.14 |
| 7,326,915 | B2 * | 2/2008 | Kaluzhny ............. H01L 25/167 250/205 |
| 7,348,583 | B2 | 3/2008 | Velez et al. |
| 7,580,441 | B2 | 8/2009 | Lee et al. |
| 8,254,416 | B2 | 8/2012 | Park et al. |
| 8,457,453 | B2 | 6/2013 | Lipson |
| 8,866,058 | B2 * | 10/2014 | Voigt .................... H04B 10/572 250/205 |
| 9,507,238 | B2 * | 11/2016 | Khurgin ................ G02F 1/2257 |
| 9,634,769 | B2 * | 4/2017 | Liaw .................... H04B 10/572 |
| 9,683,830 | B2 | 6/2017 | Qiu et al. |
| 2004/0109225 | A1 * | 6/2004 | Hu ...................... H01S 3/06716 359/341.1 |
| 2005/0036527 | A1 * | 2/2005 | Khazaei ................... H01S 3/067 372/29.02 |
| 2006/0171633 | A1 * | 8/2006 | Voigt .................... G01C 19/721 385/37 |
| 2015/0188640 | A1 * | 7/2015 | Liaw .................... H04B 10/572 398/79 |
| 2018/0197052 | A1 * | 7/2018 | Yanson .............. G06K 19/0614 |
| 2018/0329143 | A1 | 11/2018 | Feke et al. |
| 2018/0356228 | A1 | 12/2018 | Feke |

OTHER PUBLICATIONS

Chakraborty, S. and Kumari, S., "Simulation of transmission characteristics of birefringent filter using magneto-optic elements," J. Opt, vol. 44; No. 3; 281-289 (2015).

Wang, A., "High Stability Er-Doped Superfluorescent Fiber Source Improved by Incorporating Bandpass Filter," IEEE Photonics Technology Letters, vol. 23 No. 4, pp. 227-229 (Feb. 1, 2011).

Guha, B. et al., "Minimizing temperature sensitivity of silicon Mach-Zehnder interferometers," Optics Express, vol. 18; No. 3; 1879-1887 (2010).

Guha, B. et al., "Althermal silicon microring resonators with titanium oxide cladding," Optics Express, vol. 21; No. 22; 26557-26563 (2013).

Hiraki, T. et al., "Small sensivitivity to temperature variations of Si-photonic Mach-Zehnder interferometer using Si and SiN waveguides," Frontiers in Materials, vol. 2; 1-5 (2015).

Kokubun, Y., "Athermal Waveguides and Temperature Insensitive Lightwave Devices," IEEE; 1143-1144 (1999).

Munin, E., "Analysis of a Tunable Bandpass Filter Based on Faraday Rotators," IEEE Transactions on Magnetics, vol. 32; No. 2; 316-319 (1996).

Tanobe, H. et al., "A Temperature Insensitive InGaAsP-InP Optical Filter," IEEE Photonics Technology Letters, vol. 8; No. 11; 1489-1491 (1996).

Tsuzuki, K. et al., "Temperature insensitive InGaAsP/InP optical filter integrated with dual photodiodes," Electronics Letters, vol. 33, No. 23; 1948-1949 (1997).

Uenuma, M. and Moooka, T, "Temperature-independent silicon waveguide optical filter," Optics Letters, vol. 34; No. 5; 599-601 (2009).

Xing, P. and Viegas, J., "Broadband CMOS-compatible SOI temperature insensitive Mach-Zehnder interferometer," Optics Express, vol. 23; No. 19; 24098-24107 (2015).

Lefèvre, H. C., The Fiber Optic Gyroscope, 2nd Edition, Boston: Artech House (2014).

Hall, D. C. et al., "High-stability Er3+-doped superfluorescent fiber sources," J. Lightwave Tech., vol. 13, No. 7, pp. 1452-1460, Jul. 1995.

First Sensor, WS Series Data Sheet, US Order No. 10-044; International Order No. 500008; 4 pages [Downloaded on Jun. 26, 2012].

First Sensor, First Sensor WS PD Data Sheet, Part Description W57.56 TO, Order No. 3001222; 4 pages [downloaded Feb. 14, 2018].

International Search Report and Written Opinion, issued in International Application No. PCT/US2018/030038, filed Apr. 27, 2018, entitled "Polarization-Based Filter Stabilization of Broadband Light Sources," dated Aug. 10, 2018, 17 pages.

Non-Final Office Action for U.S. Appl. No. 15/965,821 dated Mar. 15, 2019.

Notice of Allowance for U.S. Appl. No. 15/965,821 dated Sep. 16, 2019.

Gao, et al., "Temperature compensated microfiber Bragg gratings," Optics Express, vol. 20, No. 16 (Jul. 30, 2012).

Chaves, et al., "Strain and Temperature Characterization of LPGs Written by CO2 Laser in Pure Silica LMA Photonic Crystal Fibers," Photonic Sensors, vol. 5, No. 3, pp. 241-250 (2015).

Kamikawachi, et al., "Nonlinear Temperature Dependence of Etched Fiber Bragg Gratings," IEEE Sensors Journal, vol. 7, No. 9 (Sep. 2007).

Kim, et al., "A Temperature-Insensitive Cladding-Etched Fiber Bragg Grating Using a Liquid Mixture with a Negative Thermp-Optic Coefficient," Sensors, No. 12, pp. 7886-7892 (2012).

Madhavan, et al., "Temperature and Strain Sensitivity of Long Period Grating Fiber Sensor: Review," IJRET, vol. 4, Issue 2 (Feb. 2015).

Shu, et al., "Sensitivity Characteristics of Long-Period Fiber Gratings," Journal of Lightwave Technology, vol. 20, No. 2 (Feb. 2002).

Texas Instruments Incorporated "Single-Supply, High-Speed, Precision Logarithmic Amplifier", LOG114, Texas Instruments, SBOS301A, Mar. 2007, consisting of 30 pages.

(56) References Cited

OTHER PUBLICATIONS

Winters et al. "Adaptive Nonlinear Cancellation for High-Speed Fiber-Optic Systems", Journal of Lightwave Technology, vol. 10, No. 7, Jul. 1992, consisting of 7 pages.

Notice of Allowance for U.S. Appl. No. 15/965,821, entitled "Polarization-Based Filter Stabilization of Broadband Light Sources", dated Oct. 28, 2019.

International Preliminary Report on Patentability "Polarization-Based Filter Stabilization of Broadband Light Sources", dated Nov. 7, 2019.

Notice of Allowance for U.S. Appl. No. 15/965,821, entitled "Polarization-Based Filter Stabilization of Broadband Light Sources", dated Feb. 12, 2020.

\* cited by examiner

STABILIZED BROADBAND LIGHT SOURCE APPARATUS AND METHODS

RELATED APPLICATION

This application claims the benefit of U.S. Provisional Application No. 62/491,098, filed on Apr. 27, 2017. The entire teachings of the above Application are incorporated herein by reference.

FIELD

This disclosure relates generally to light sources and more particularly to a passively wavelength stabilized broadband light source apparatus and method for delivering output light with stabilized centroid wavelength.

BACKGROUND

Broadband light sources, for example light sources with full width at half maximum (FWHM) bandwidth of about 5 nm or greater, are well known in the art and are used in a variety of applications. In particular, broadband light sources such as superluminescent diodes (SLDs), rare-earth-doped superluminescent sources (REDSLSs), and light emitting diodes (LEDs) are useful in applications related to interferometry to avoid coherence noise effects.

In one example application of broadband light sources, fiber optic gyroscopes (FOGs) use the interference of light to measure angular velocity, as known in the art. Rotation is sensed in a FOG with a large coil of optical fiber forming a Sagnac interferometer as described for example in H. C. Lefèvre, The Fiber Optic Gyroscope, 2nd Edition, Boston: Artech House (2014). The induced phase shift between the counterpropagating light waves injected in the sensor coil is proportional to the rotation rate. The proportionality constant, called "scale factor," is given by $2\pi LD/\bar{\lambda}c$, where L is the length of the fiber coil, D is the diameter of the fiber coil, c is the speed of light in vacuum, and $\bar{\lambda}$ is the average, or centroid, wavelength of the light waves propagating in the coil. The centroid wavelength is defined by equation 1:

$$\bar{\lambda} = \frac{\int \lambda P(\lambda) d\lambda}{\int P(\lambda) d\lambda}$$

where λ is the wavelength of the spectral components of the light waves, and P(λ) is the optical power as a function of λ, that is, the spectral distribution of the light waves. Hence the accuracy of the gyroscope is limited by the accuracy with which $\bar{\lambda}$ of the light source is known. In particular, for FOGs to be useful in certain navigation applications, the $\bar{\lambda}$ must be known to an accuracy of 10 parts per million (ppm) or better over a range of ambient temperature ΔT that can span up to 10° C. or more, that is $$\frac{1}{\bar{\lambda}}\frac{\Delta \bar{\lambda}}{\Delta T} = \frac{1}{\bar{\lambda}}\alpha < 10^{-6} \frac{1}{°C.}$$

where the thermal sensitivity of the centroid wavelength is defined as $\alpha = \bar{\lambda}/\Delta T$.

Broadband light sources are particularly advantageous for introducing the light into the sensor coil because phase coherent noise effects due to backscattering noise and polarization coupling is suppressed, the residual intensity noise (RIN) of the FOG decreases with increasing bandwidth, and the zero-rotation drift induced through the Kerr effect by relative variations in the two counterpropagating optical powers is reduced. Such effects would otherwise cause significant reduction in rotation sensitivity and accuracy. The relatively small size, low power consumption and low cost of SLDs are advantageous for many FOG applications. However, the inherent thermal sensitivity of the centroid wavelength $\alpha_{SOURCE}$ of SLDs is typically +250 to +400 ppm/° C., which is problematic for certain FOG applications even when thermoelectric cooling devices and other temperature compensation components, circuits and techniques are utilized. Consequently, REDSLSs, such as erbium-doped fiber amplifiers, having significantly lower centroid wavelength thermal sensitivity, have tended to find application in FOGs. For example, in D. C. Hall et al., "High-stability $Er^{3+}$-doped superfluorescent fiber sources," *J. Lightwave Tech.*, Vol. 13, No. 7, pp. 1452-1460, July 1995, a centroid wavelength thermal sensitivity of 3-5 ppm/° C. is reported for an erbium-doped fiber amplifier type REDSLS.

In addition to FOGs, other optical sensors and measuring devices as known in the art, such as accelerometers, pressure sensors, strain sensors, temperature sensors, profilometers, fiber optic link test equipment, and optical coherence tomography systems, provide applications for which broadband light sensors enjoy utility and wherein the accuracy of the centroid wavelength is critical to performance. Various strategies for wavelength stabilization against environmental factors, such as ambient temperature, have been invoked to improve centroid wavelength accuracy. These strategies include both active and passive stabilization methods.

SUMMARY

Applicants have recognized a need for an improved wavelength-stabilized broadband light source apparatus and method. Existing active wavelength stabilization approaches, for example, require a relatively complicated set-up using accordingly relatively expensive components and/or a high computation power to numerically compensate inaccuracies and/or bring about high losses, which makes a solution with a small form factor and no additional electronics difficult to realize.

Existing passive wavelength stabilization strategies that invoke broadband optical filters for filtering broadband sources are subject to undesirable compromises in the overall performance of the broadband light source with regard to reduced optical power and reduced bandwidth.

Embodiment apparatus and methods provide significant advantages over prior stabilization solutions, in that wavelength stabilization of broadband light sources can be achieved with less degradation of transmitted output optical power and transmitted optical bandwidth in the presence of ambient temperature fluctuations, together with benefitting from relatively less-complex passive stabilization.

In a particular embodiment, a broadband light source apparatus includes a broadband light source configured to provide broadband source light characterized by a source wavelength spectrum having a source centroid wavelength thermal sensitivity. The apparatus also includes a broadband optical filter characterized by a filter wavelength spectrum, the filter wavelength spectrum having one or more spectral characteristics, the filter wavelength spectrum further having a thermal sensitivity with magnitude and sign. The broadband optical filter is configured to receive the source light and to deliver broadband output light characterized by an output wavelength spectrum that is a function of the source and filter wavelength spectra. The broadband output light has an output centroid wavelength, and the one or more spectral characteristics and the magnitude and sign of the thermal sensitivity of the filter wavelength spectrum are configured to minimize a thermal sensitivity of the output centroid wavelength.

The one or more spectral characteristics and the magnitude and sign of the thermal sensitivity of the filter wavelength spectrum may be further configured to minimize the thermal sensitivity of the output centroid wavelength to within ±50 parts per million per degree C. (ppm/° C.), ±5 ppm/° C., ±0.5 ppm/° C., or ±0.2 ppm/° C. The one or more spectral characteristics and the magnitude and sign of the thermal sensitivity of the filter wavelength spectrum may be further configured to minimize the thermal sensitivity of the output centroid wavelength over a temperature range of 0.1° C., 1.0° C., 10° C., or 100° C.

The one or more spectral characteristics and the magnitude and sign of the thermal sensitivity of the filter wavelength spectrum may be further configured such that a relative integrated output power of the broadband output light is maximized. The relative integrated output power may be maximized to at least 0.3, at least 0.6, or at least 0.9. The sign of the thermal sensitivity of the filter wavelength spectrum may be negative.

The broadband optical filter can be an asymmetric Mach-Zehnder interferometer (MZI) structure or a waveguide Bragg grating structure. The waveguide Bragg grating structure may include at least one of a core and cladding including $TiO_2$. The broadband optical filter may be an interference filter. The light source and the interference filter may be mechanically attached to a bi-material strip. The thermal sensitivity of the filter wavelength spectrum can be an effective thermal sensitivity that is negative in sign due to relative angular displacement of the light source and the interference filter as a function of ambient temperature.

The broadband optical filter may include two or more sub-filters. The thermal sensitivity of the filter wavelength spectrum can be negative in sign, and the two or more sub-filters can have respective wavelength spectrum thermal sub-sensitivities, with at least one of the sub-sensitivities being positive in sign. The broadband optical filter wavelength spectrum can be at least 5 nm in width. Width may be measured or calculated using the full width at half maximum (FWHM) method.

The light source may include at least one of a superluminescent diode (SLD), a rare-earth-doped superluminescent source (REDSLS), and a light emitting diode (LED). A fiber-optic gyroscope (FOG) may include the broadband light source apparatus, and the FOG may also include a coil of optical fiber and an optical coupling configured to couple the broadband output light into the coil of optical fiber.

In another embodiment, a method for optimizing broadband light includes providing a broadband light source having a source wavelength spectrum characterized by a source centroid wavelength thermal sensitivity. The method also includes configuring a broadband optical filter to be characterized by a filter wavelength spectrum, the filter wavelength spectrum having one or more spectral characteristics, the filter wavelength spectrum further having a thermal sensitivity with magnitude and sign, to receive the source light, and to deliver broadband output light characterized by an output wavelength spectrum that is a function of the source and filter wavelength spectra, the broadband output light having an output centroid wavelength. The method further includes configuring the one or more spectral characteristics and the magnitude and sign of the thermal sensitivity of the filter wavelength spectrum to minimize a thermal sensitivity of the output centroid wavelength.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength to within ±50 parts per million per degree C. (ppm/° C.), ±5 ppm/° C., ±0.5 ppm/° C., or ±0.2 ppm/° C.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength over a temperature range of 0.1° C., 1° C., 10° C., or 100° C.

The method may further include configuring the one or more spectral characteristics and the magnitude and sign of the thermal sensitivity of the filter wavelength spectrum to maximize a relative integrated output power of the broadband output light. The relative integrated output power of the broadband output light may be maximized to at least 0.3, 0.6, or 0.9. The method may further include configuring the sign of the thermal sensitivity of the filter wavelength spectrum to be negative.

Configuring the one or more spectral characteristics and the magnitude and sign of the thermal sensitivity of the filter wavelength spectrum may include configuring the spectral characteristics and the magnitude and sign of the thermal sensitivity of the filter wavelength spectrum of an asymmetric Mach-Zehnder interferometer structure or a waveguide Bragg grating structure. The method can also include configuring the waveguide Bragg grating structure to include at least one of a core and a cladding including $TiO_2$.

Configuring the one or more spectral characteristics and the magnitude and sign of the thermal sensitivity of the filter wavelength spectrum may include using an interference filter mechanically attached to a bi-material strip to which a broadband light source providing the source light is also attached. Configuring the sign of the thermal sensitivity of the filter wavelength spectrum may also include configuring an effective negative sign of the thermal sensitivity of the filter wavelength spectrum due to relative angular displacement of the light source and the interference filter as a function of ambient temperature.

Configuring the one or more spectral characteristics and the magnitude and sign of the thermal sensitivity of the filter wavelength spectrum may include using two or more sub-filters. The thermal sensitivity of the filter wavelength spectrum can be negative in sign, and using the two or more sub-filters can include using sub-filters with respective wavelength thermal sub-sensitivities, at least one of the sub-sensitivities being positive in sign. Configuring the one or more spectral characteristics of the filter wavelength spectrum can include configuring the filter to deliver broadband output light with the output wavelength spectrum having a width of at least 5 nm. The width may be measured or calculated using the FWHM method.

Providing the broadband source light can include providing at least one of an SLD, a REDSLS, and an LED.

In yet another embodiment, a method of optimizing a FOG includes optimizing broadband light according to any embodiment method disclosed herein or obtaining broadband output light from any embodiment broadband light source apparatus described herein. The method may also include optically coupling the broadband output light into a coil of optical fiber of a FOG or configuring the broadband output light to be coupled into a coil of optical fiber of the FOG.

In still a further embodiment, an optical waveguide Bragg grating structure includes an optical core and an optical cladding surrounding the optical core. At least one of the optical core and the optical cladding includes a $TiO_2$ material. The optical waveguide Bragg grating structure can be a broadband optical filter characterized by a filter wavelength spectrum having a thermal sensitivity that is negative in sign.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description, the drawings serve to explain principles and operation of the various embodiments.

BRIEF DESCRIPTION OF THE DRAWINGS

For a fuller understanding of the nature and objects of the disclosed embodiments, reference should be made to the following detailed description, taken in connection with the accompanying drawings, in which.

Figure 1:
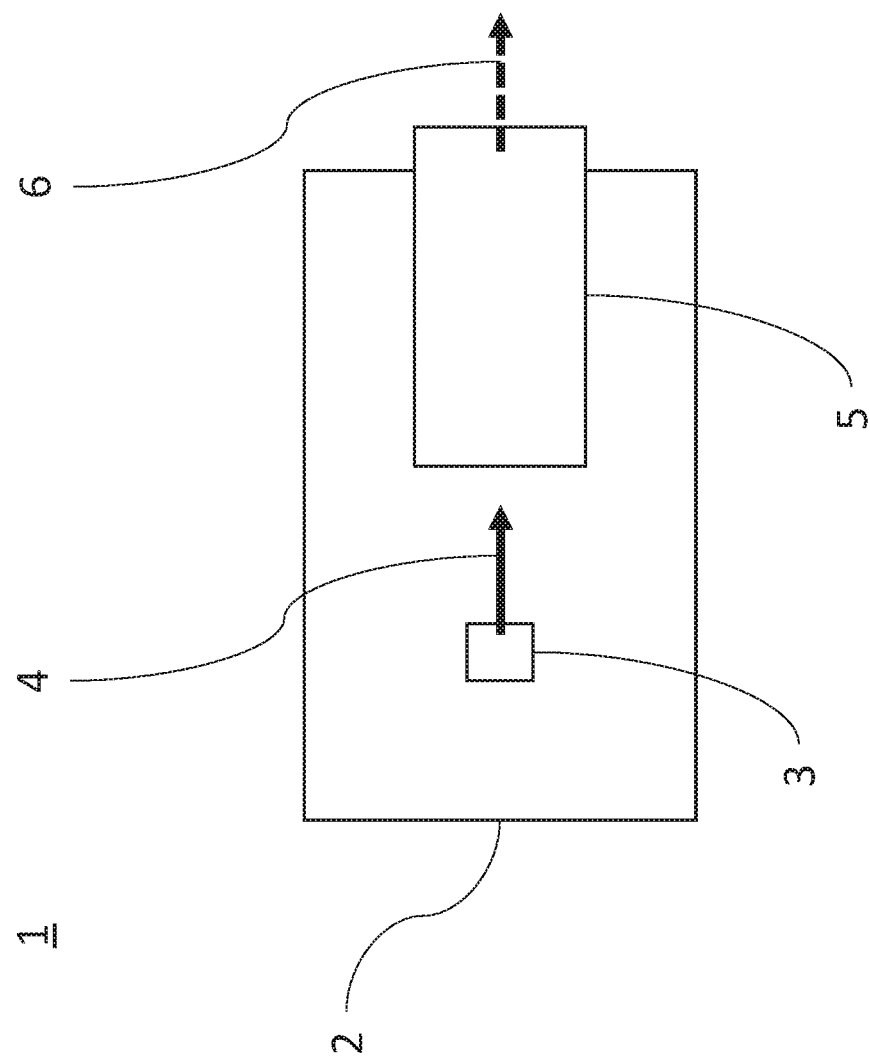
FIG. 1 is a schematic diagram of a prior art light source apparatus including a mount onto which a broadband light source and a broadband optical filter are arranged.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows. The following is a detailed description of the preferred embodiments of the invention, reference being made to the drawings in which the same reference numerals identify the same elements of structure in each of the several figures.

Figures shown and described herein are provided in order to illustrate key principles of operation and component relationships along their respective optical paths according to the present disclosure and are not drawn with intent to show actual size or scale. Some exaggeration may be necessary in order to emphasize basic structural relationships or principles of operations.

The existing wavelength stabilization strategies that invoke broadband optical filters for filtering broadband sources are subject to undesirable compromises in the overall performance of the broadband light source with regard to reduced optical power and reduced bandwidth.

FIG. 1 is a schematic diagram of a prior art light source apparatus 1 including a mount 2 onto which are arranged broadband light source 3, such as an SLD, REDSLS, or LED, whose emission light 4 has a temperature-dependent source spectrum, and a broadband optical filter 5 for delivering output light 6 with a temperature-dependent output wavelength spectrum whose centroid wavelength consequently has a temperature sensitivity.

Figure 2:
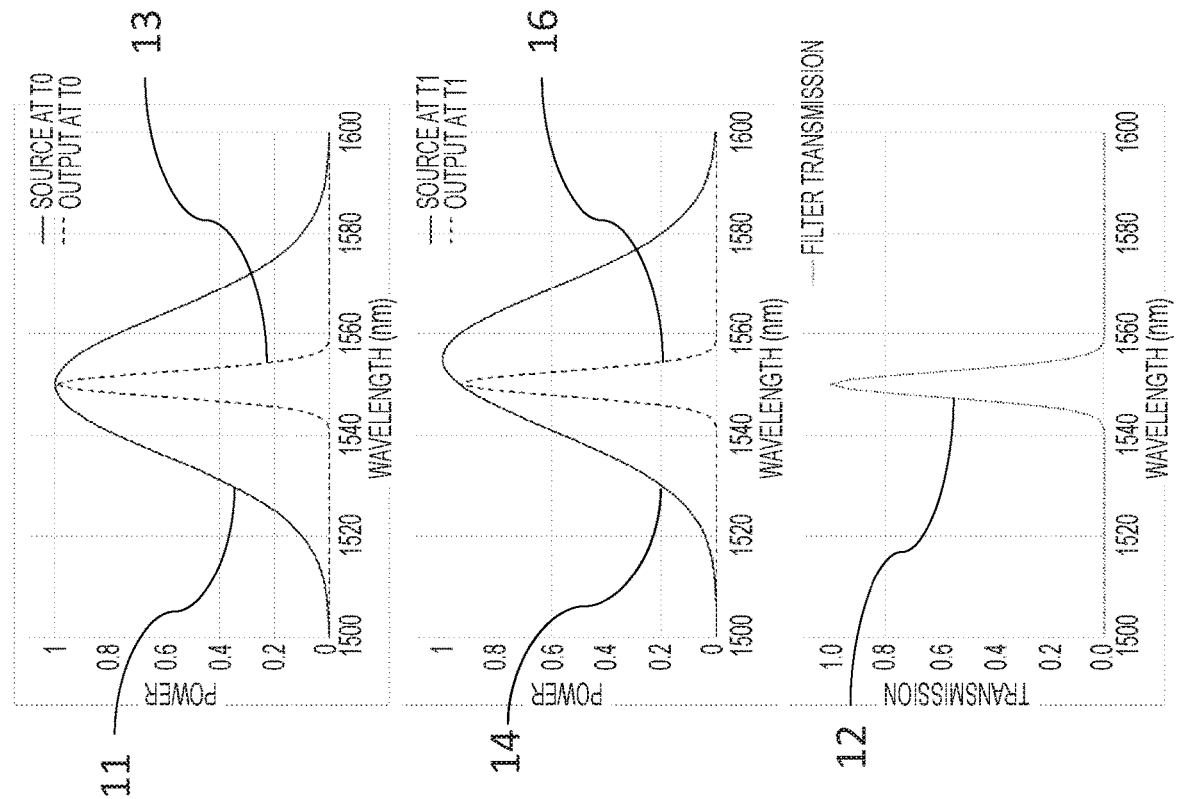
FIG. 2 shows the simulated source, filter, and output spectra for prior art light source apparatus shown in FIG. 1, whereby the filter has a Gaussian transmission spectrum.

FIG. 2 shows the simulated source spectrum 11, filter spectrum 12, and output spectrum 13, determined by the product of the source spectrum and filter spectrum, at temperature $T_0$; and the simulated source spectrum 14 and output spectrum 16, determined by the product of the source spectrum and filter spectrum, at temperature $T_1$, where $T_1 > T_0$; for prior art light source apparatus 1 whereby source wavelength spectra 11 and 14 are characterized by Gaussian functions, filter wavelength spectrum 12 is characterized by a Gaussian function, both the source wavelength spectrum 11 and filter wavelength spectrum 12 have a maximum at 1550 nm at $T_0$, and the full width at half maximum FWHM$_{SOURCE}$ spectral characteristic of source 3 is 33 nm (typical for FOG applications using SLDs or REDSLSs). Since the best-case thermal sensitivity of the filter wavelength spectrum $\alpha_{FILTER}$ of 0 nm/° C. is assumed for prior art broadband filter 5, filter spectrum 12 is identical at $T_0$ and $T_1$.

Figure 3:
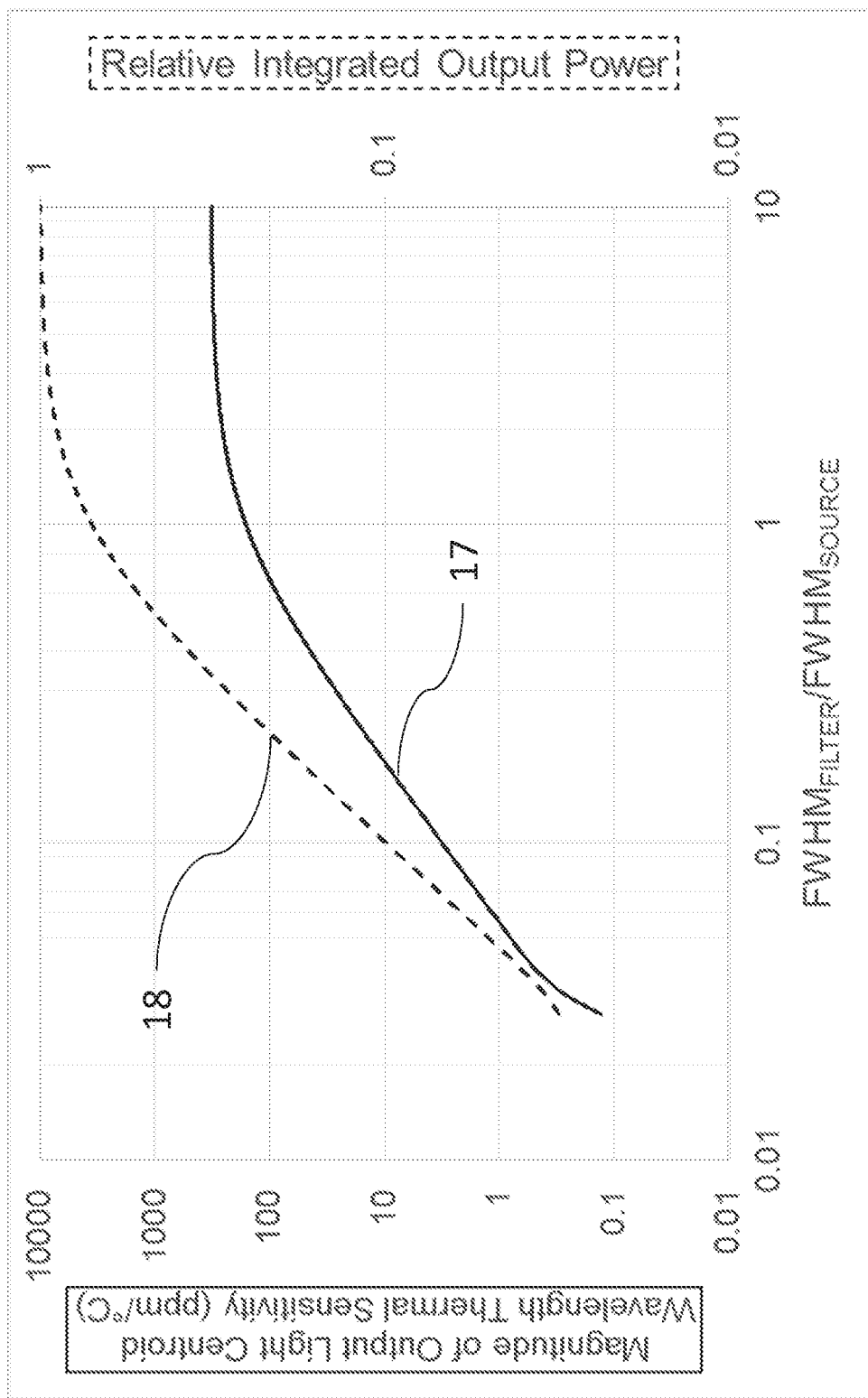
FIG. 3 shows a simulated dependence of the thermal sensitivity of the output light centroid wavelength and the relative integrated optical power on the ratio of the filter width to the source width given the spectra shown in FIG. 2.

FIG. 3 shows a simulated dependence of the thermal sensitivity $\alpha_{OUTPUT}$ 17 of the centroid wavelength of output light 6 between $T_0$ and $T_1$ (solid curve), and a simulated dependence of the integrated output power (relative to inherent source integrated output power) $\int P_{OUTPUT}(\lambda)d\lambda/\int P_{SOURCE}(\lambda)d\lambda$ 18 of output light 6 averaged over a temperature range of 1° C. (dashed curve), on the ratio of the full width at half maximum (FWHM$_{FILTER}$) spectral characteristic of filter wavelength spectrum 12 to FWHM$_{SOURCE}$ of source wavelength spectra 11 and 14 corresponding to the wavelength spectra shown in FIG. 2, whereby the inherent thermal sensitivity $\alpha_{SOURCE}$ of the centroid wavelength of source 3 is +0.5 nm/° C., or +323 ppm/° C. (typical for SLDs). According to the simulation, to achieve thermal sensitivity of the output light centroid wavelength of magnitude less than 10 ppm/° C., which is often considered a threshold requirement for many navigation applications, FWHM$_{FILTER}$/FWHM$_{SOURCE}$ must be less than 0.18, in which case the relative integrated output power is only 0.177 or 17.7%, which is relatively inefficient.

Figure 4:
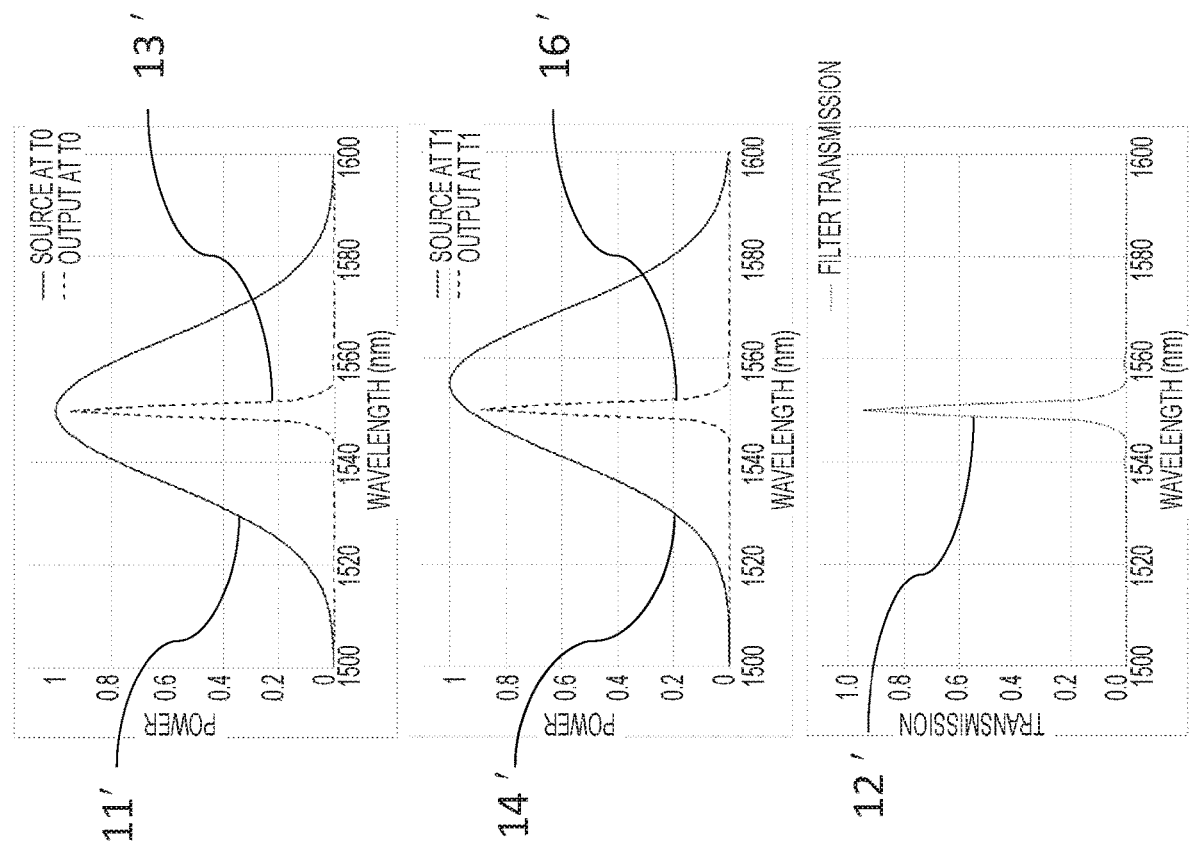
FIG. 4 shows the simulated source, filter, and output spectra for prior art light source apparatus shown in FIG. 1, whereby the filter has a transmission spectrum characteristic of a Bragg grating.
Figure 5:
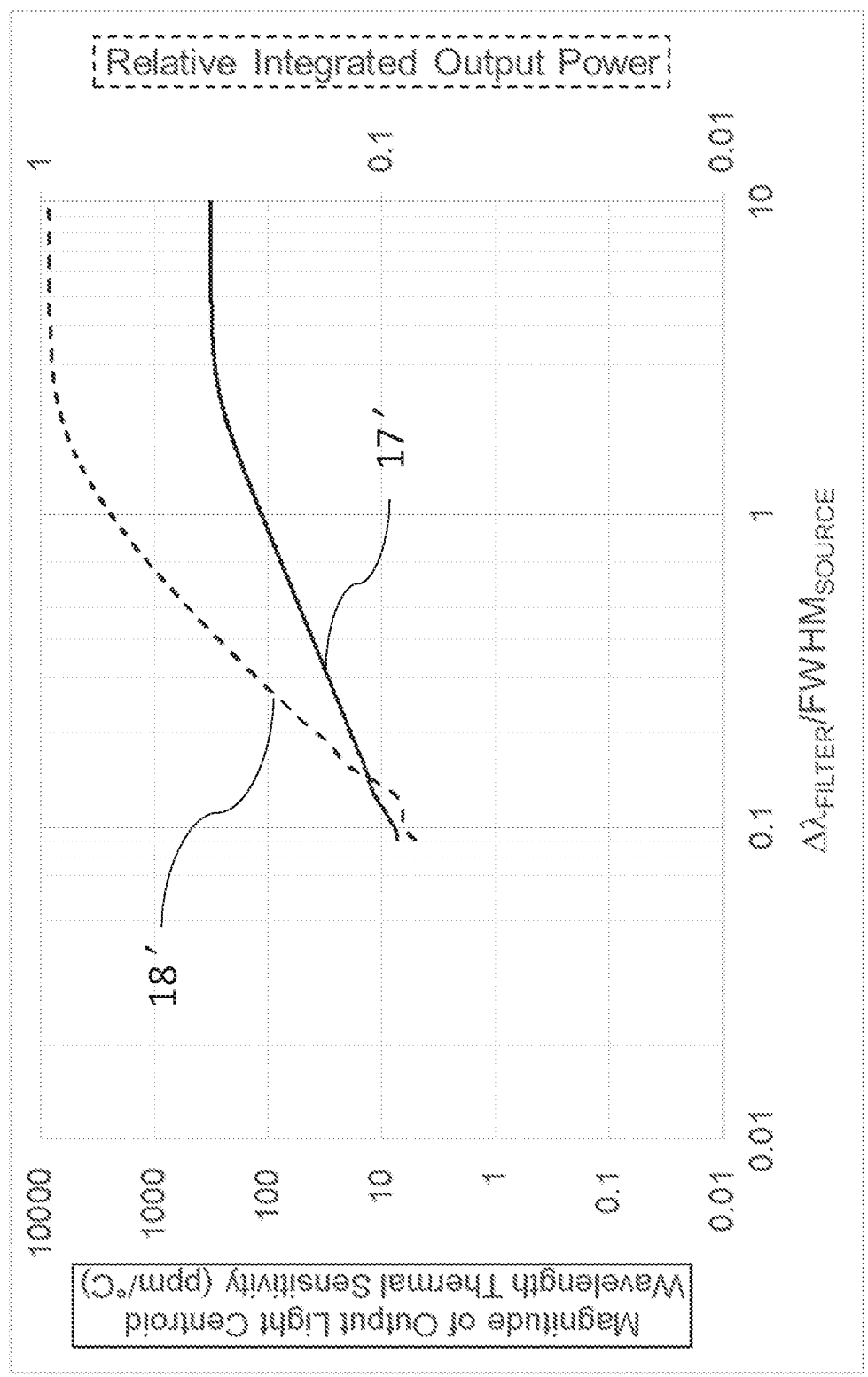
FIG. 5 shows a simulated dependence of the thermal sensitivity of the output light centroid wavelength and the relative integrated optical power on the ratio of the filter width to the source width given the spectra shown in FIG. 4.

FIG. 4 shows the simulated source wavelength spectrum 11', filter wavelength spectrum 12', and output wavelength spectrum 13', determined by the product of the source wavelength spectrum and filter wavelength spectrum, at temperature $T_0$; and the simulated source wavelength spectrum 14' and output wavelength spectrum 16', determined by the product of the source wavelength spectrum and filter wavelength spectrum, at temperature $T_1$, where $T_1 > T_0$; for prior art light source apparatus 1 whereby source wavelength spectra 11' and 14' are characterized by Gaussian functions, filter wavelength spectrum 12' is characterized by a function characteristic of a Bragg grating, both the source wavelength spectrum 11' and filter wavelength spectrum 12' have a maximum at 1550 nm at $T_0$, and FWHM$_{SOURCE}$ is 33 nm. Since the best-case thermal sensitivity of the filter wavelength spectrum $\alpha_{FILTER}$ of 0 nm/° C. is assumed for prior art broadband filter 5, filter wavelength spectrum 12' is identical at $T_0$ and $T_1$. FIG. 5 shows a simulated dependence of the thermal sensitivity $\alpha_{OUTPUT}$ 17' of the centroid wavelength of output light 6 between $T_0$ and $T_1$ (solid curve), and a simulated dependence of the integrated output power (relative to inherent source integrated output power) $\int P_{OUTPUT}(\lambda)d\lambda/\int P_{SOURCE}(\lambda)d\lambda$ 18' of output light 6 averaged over a temperature range of 1° C. (dashed curve), on the ratio of the width of filter wavelength spectrum 12' between the first zeros on either side of the maximum reflectivity ($\Delta\lambda_{FILTER}$) spectral characteristic of filter wavelength spectrum 12' to FWHM$_{SOURCE}$ of source wavelength spectra 11' and 14' corresponding to the wavelength spectra shown in FIG. 4, whereby the inherent thermal sensitivity $\alpha_{SOURCE}$ of the centroid wavelength of source 3 is +0.5 nm/° C., or +323 ppm/° C. According to the simulation, to achieve thermal sensitivity of the output light centroid wavelength of magnitude less than 10 ppm/° C., $\Delta\lambda_{FILTER}$/FWHM$_{SOURCE}$ must be less than 0.11, in which case the relative integrated output power is only 0.087 or 8.7%, which is relatively inefficient.

Figure 6:
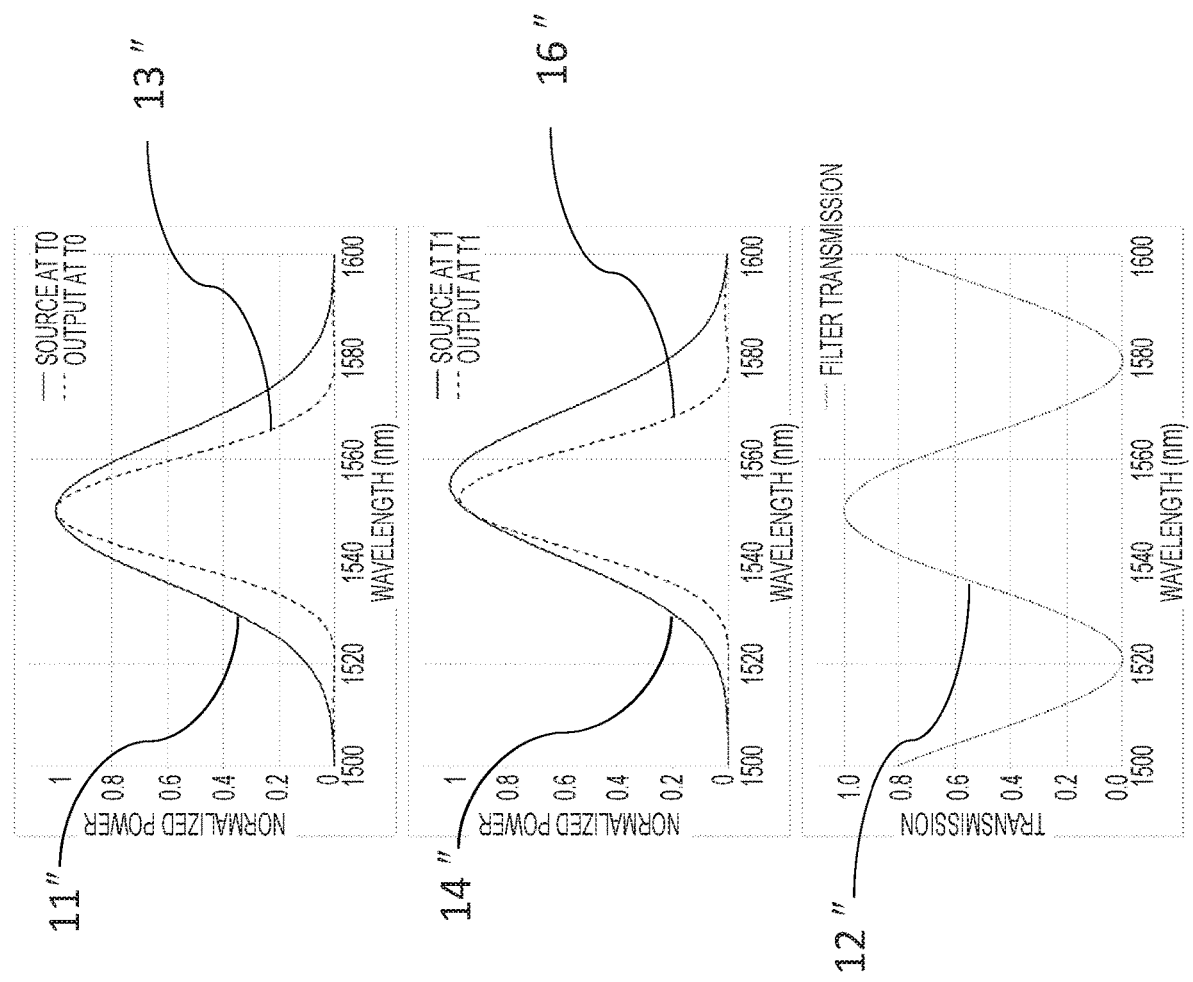
FIG. 6 shows the simulated source, filter, and output spectra for prior art light source apparatus shown in FIG. 1 whereby the filter has a raised sinusoidal transmission spectrum.
Figure 7:
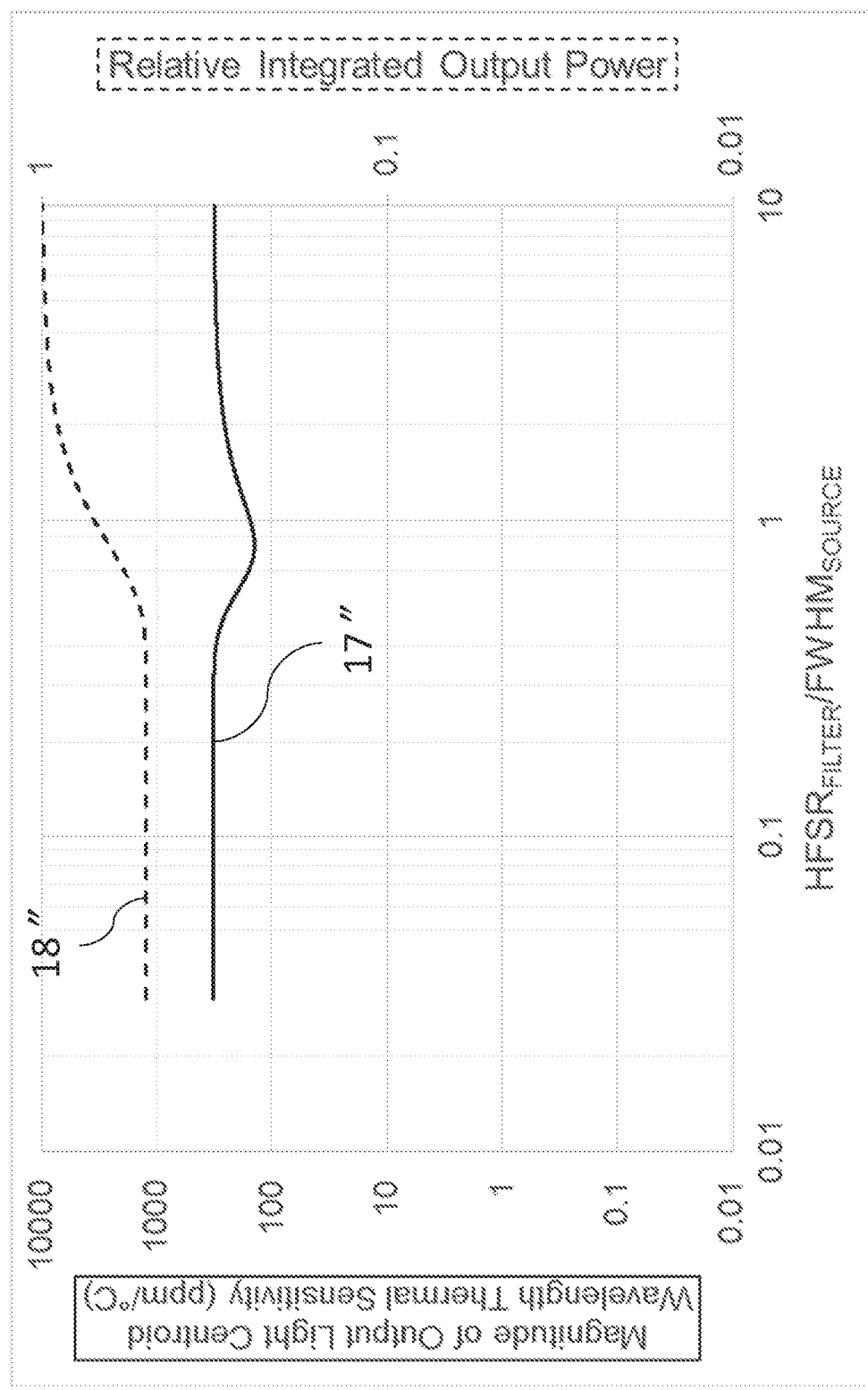
FIG. 7 shows a simulated dependence of the thermal sensitivity of the output light centroid wavelength and the relative integrated optical power on the ratio of the filter width to the source width given the spectra shown in FIG. 6.

FIG. 6 shows the simulated source wavelength spectrum 11", filter wavelength spectrum 12", and output wavelength spectrum 13", determined by the product of the source wavelength spectrum and filter wavelength spectrum, at temperature $T_0$; and the simulated source wavelength spectrum 14" and output wavelength spectrum 16", determined by the product of the source wavelength spectrum and filter wavelength spectrum, at temperature $T_1$, where $T_1 > T_0$; for prior art light source apparatus 1 whereby source wavelength spectra 11" and 14" are characterized by Gaussian functions, filter wavelength spectrum 12" is characterized by a raised sinusoidal function, both the source wavelength spectrum 11" and filter wavelength spectrum 12" have a maximum at 1550 nm at $T_0$, and $FWHM_{SOURCE}$ is 33 nm. Since the best-case thermal sensitivity of the filter wavelength spectrum $\alpha_{FILTER}$ of 0 nm/° C. is assumed for prior art broadband filter 5, filter wavelength spectrum 12" is identical at $T_0$ and $T_1$. FIG. 7 shows a simulated dependence of the thermal sensitivity $\alpha_{OUTPUT}$ 17" of the centroid wavelength of output light 6 between $T_0$ and $T_1$ (solid curve), and a simulated dependence of the integrated output power (relative to inherent source integrated output power) $\int P_{OUTPUT}(\lambda)d\lambda / \int P_{SOURCE}(\lambda)d\lambda$ 18" of output light 6 averaged over a temperature range of 1° C. (dashed curve), on the ratio of the width of filter wavelength spectrum 12" as defined by one half of the FSR of the raised sinusoidal function ($HFSR_{FILTER}$) spectral characteristic of filter wavelength spectrum 12" to $FWHM_{SOURCE}$ of source wavelength spectra 11" and 14" corresponding to the wavelength spectra shown in FIG. 6, whereby the inherent thermal sensitivity $\alpha_{SOURCE}$ of the centroid wavelength of source 3 is +0.5 nm/° C. or +323 ppm/° C. According to the simulation, the minimum thermal sensitivity of the output light centroid wavelength is only +143 ppm/° C. where $HFSR_{FILTER}/FWHM_{SOURCE}$ is 0.833, in which case the relative integrated output power is 0.639 or 63.9% (in the absence of any secondary filtering to attenuate side lobes).

Although various strategies are known in the art for enhancing the source wavelength spectrum, such as tailoring the shape to a flat-top or super-Gaussian wavelength spectrum, to reduce thermal sensitivity of the output light centroid wavelength in conjunction with bandpass filtering, all such known strategies are subject to undesirable compromises in the overall performance of the broadband light source with regard to reduced optical power and reduced bandwidth.

Accordingly, the inventors have recognized a need for an improved wavelength-stabilized broadband light source apparatus and method.

Figure 8:
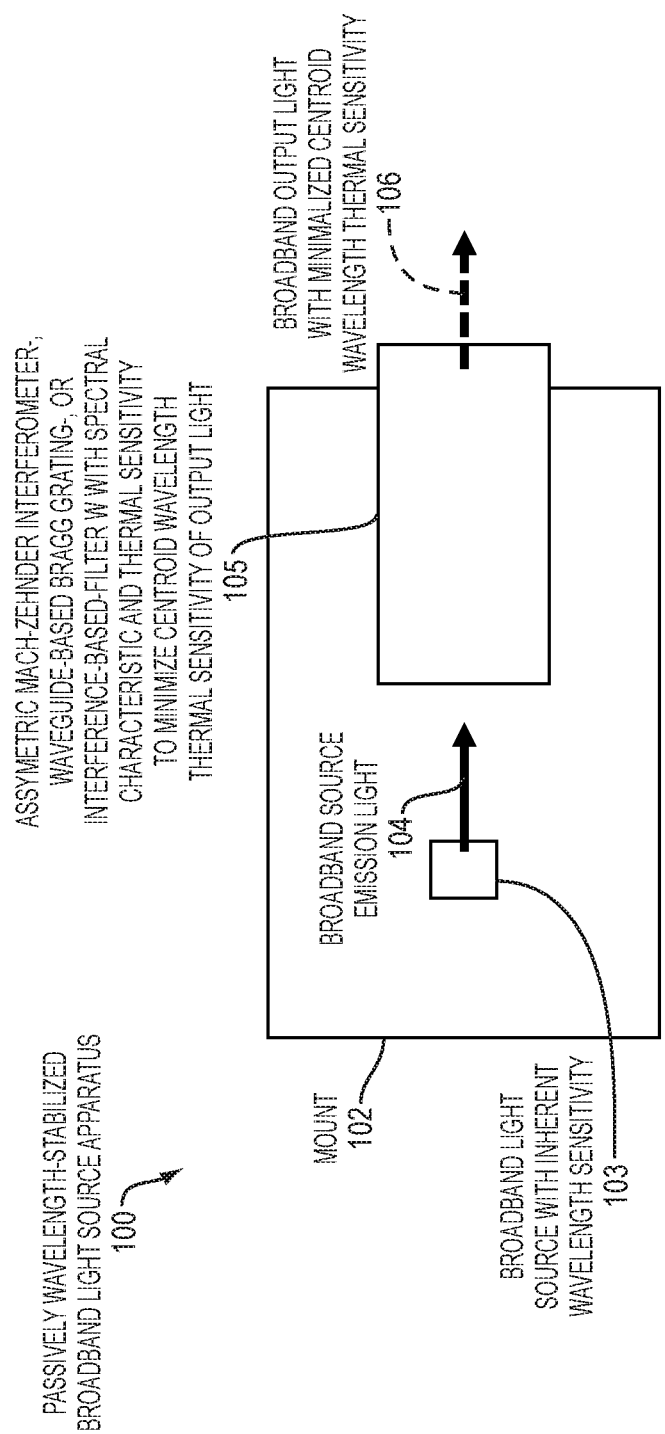
FIG. 8 is a schematic top plan view of an embodiment passively wavelength-stabilized broadband light source apparatus for delivering output light with output centroid wavelength having minimized thermal sensitivity, the apparatus including a broadband light source and at least one broadband optical filter.

FIG. 8 is a schematic top plan view of passively wavelength-stabilized broadband light source apparatus 100 for delivering broadband output light 106 with output centroid wavelength having minimized thermal sensitivity including a mount 102 that serves as a mechanical base for broadband light source 103, such as a superluminescent diode (SLD), rare-earth-doped superluminescent source (REDSLS), or light emitting diode (LED), whose emission light 104 (also referred to herein as broadband source light) is characterized by a temperature-dependent source wavelength spectrum having a source centroid wavelength thermal sensitivity. The apparatus 100 also includes at least one broadband optical filter 105 with a filter wavelength spectrum, whose thermal sensitivity has magnitude and sign. The broadband optical filter 105 is configured to receive the source light 104 and to deliver the broadband output light 106. The light 106 has an output wavelength spectrum that is a function of the source and filter wavelength spectra. The broadband optical filter 105 is characterized by a filter wavelength spectrum, the filter wavelength spectrum having one or more spectral characteristics, and the filter wavelength spectrum has a thermal sensitivity with magnitude and sign. The broadband output light 106 has an output centroid wavelength. One or more spectral characteristic of the filter 105, as well as the magnitude and sign of the thermal sensitivity of the filter wavelength spectrum, are configured to minimize a thermal sensitivity of the output centroid wavelength of the broadband output light 106.

The broadband optical filter 105 is configured to receive the source light 104 and to deliver the broadband output light 106, which is characterized by an output wavelength spectrum that is a function of the source and filter wavelength spectra. The broadband optical filter 105 may be an asymmetric Mach-Zehnder interferometer structure or a waveguide Bragg grating structure, as described in connection with specific embodiments hereinafter. The waveguide Bragg grating structure may include at least one of a core and cladding including $TiO_2$. As a further alternative, the broadband optical filter may be an interference filter. The light source and the interference filter may be mechanically attached to a bi-material strip. The filter wavelength thermal sensitivity can be an effective filter wavelength thermal sensitivity that is negative in sign due to relative angular displacement of the light source and the interference filter as a function of ambient temperature.

The broadband optical filter may include two or more sub-filters in some embodiments. The thermal sensitivity of the filter wavelength spectrum can be negative in sign, and the two or more sub-filters can have respective wavelength thermal sub-sensitivities, with at least one of the sub-sensitivities being positive in sign.

The filter 105 may be configured based on the spectral characteristics of the source 103. Specifically, the filter 105 may be configured to have a filter wavelength spectrum with one or more spectral characteristics such as spectral width, spectral shape—or other spectral characteristics. Furthermore, the filter wavelength spectrum of filter 105 may be configured to have a thermal sensitivity with magnitude and sign, and a combination of these filter characteristics may result in of the broadband output light 106, which is characterized by an output wavelength spectrum. Some output wavelength spectra, and their variation with ambient temperature, are described hereinafter in connection with elements 113a-e and 116a-e of FIG. 10, for example. The filter wavelength spectrum characterizing the output light 106 can be configured such that the thermal sensitivity of the output centroid wavelength can be minimized, as further described hereinafter.

In various embodiments, the one or more spectral characteristics and the magnitude and sign of the thermal sensitivity of the filter wavelength spectrum may be configured to minimize the thermal sensitivity of the output spectrum centroid wavelength to within ±50 parts per million per degree C. (ppm/° C.), ±5 ppm/° C., ±0.5 ppm/° C., or ±0.2 ppm/° C., for example. The one or more spectral characteristics and the magnitude and sign of the thermal sensitivity of the filter wavelength spectrum may be further configured to minimize the thermal sensitivity of the output centroid wavelength over a temperature range of 0.1° C., 1.0° C., 10° C., or 100° C., for example.

Furthermore, in some embodiments described hereinafter, the filter 105 may be configured to be characterized by filter wavelength spectral characteristics or filter centroid wavelength thermal sensitivity magnitude and sign that are configured such that the output light 106 is maximized. In particular, a relative integrated output power of the broadband output light may be maximized to at least 0.3, at least 0.6, or at least 0.9, for example. The sign of the thermal sensitivity of the filter wavelength spectrum may be negative in many embodiments, such that an inherent positive thermal sensitivity of the centroid wavelength of the broadband light source may be carefully counteracted to produce an output spectrum having output centroid wavelength with minimized thermal sensitivity.

The filter 105 is configured to receive the broadband light 104 from the source 103 at one side of the filter and to deliver the output light 106 from the opposite side of the filter. Examples of filter wavelength spectra are described hereinafter in connection with elements 112a-112e in FIG. 10, for example. Spectral characteristics of the filter can include specific filter spectral shape, such as Gaussian shape, spectral width, such as a FWHM width, which can be at least 5 nm, for example.

Figure 9:
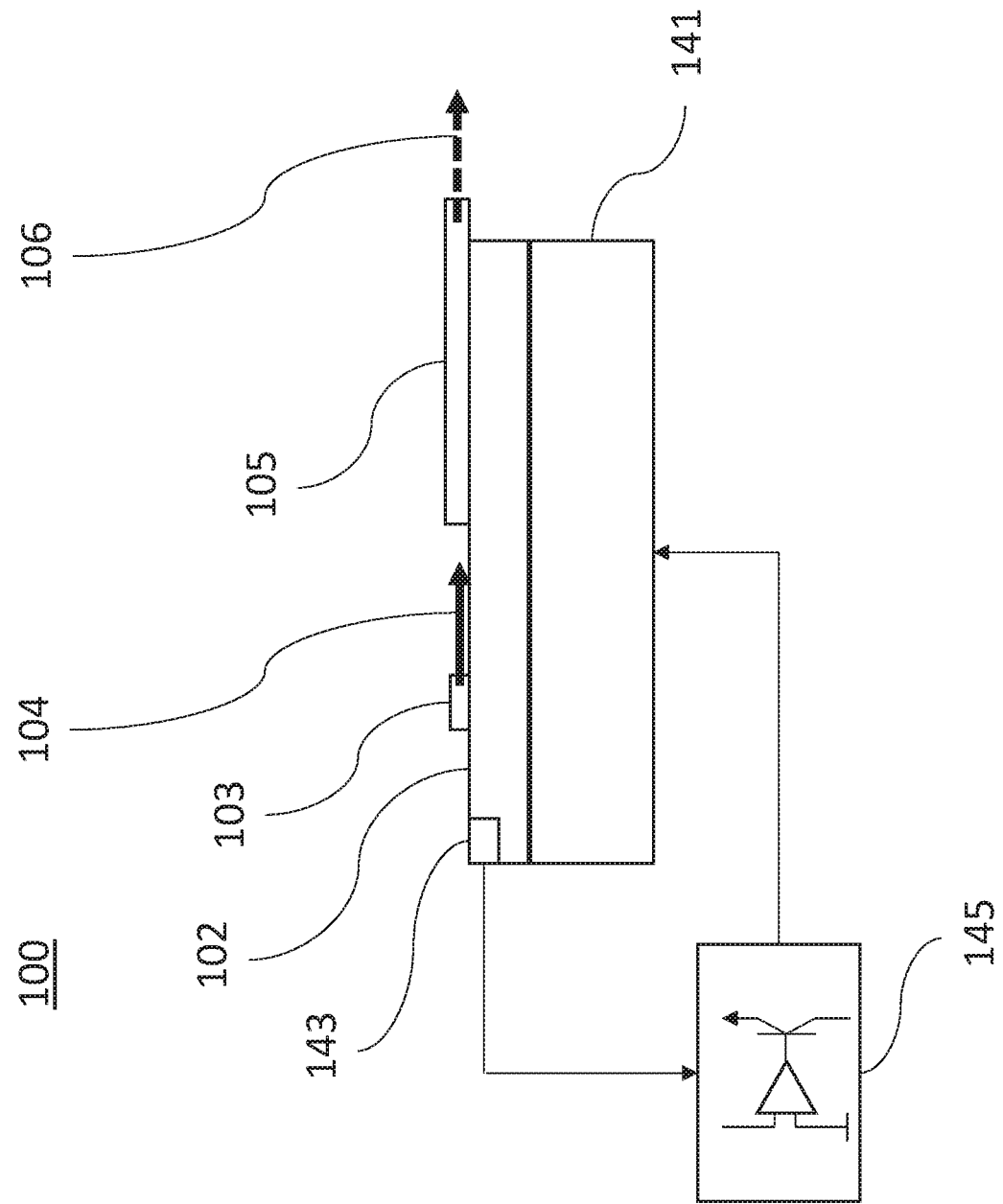
FIG. 9 is a schematic lateral view of the apparatus of FIG. 8 in thermal contact with an active temperature control element according to a preferred embodiment.

FIG. 9 is a schematic lateral view of wavelength-stabilized light source apparatus 100. Preferably mount 102 includes a common temperature stabilizer in thermal contact with both source 103 and filter 105 for defining the relative temperature of source 103 and filter 105 against environmental (ambient) temperature fluctuations in the vicinity of the apparatus 100, or even temperature fluctuations within the apparatus 100. The temperature stabilization may be entirely passive. Alternatively, mount 102 may be in thermal contact with an active temperature control device, for example a thermoelectric cooler 141 acting, together with a temperature sensor 143 and a temperature controller 145, as a temperature stabilizer against environmental temperature fluctuations.

Figure 10:
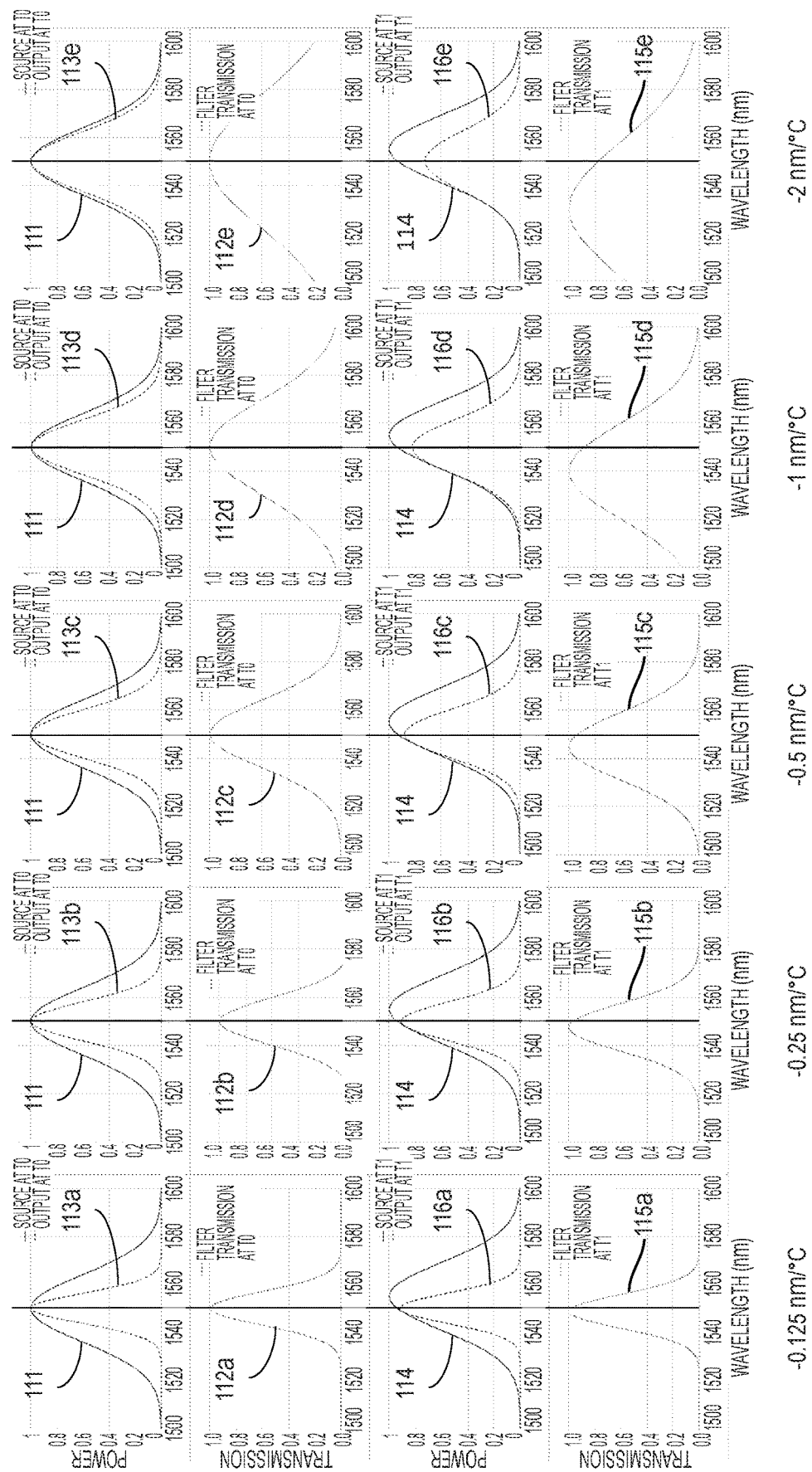
FIG. 10 shows the simulated source, filter, and output spectra with filter widths configured to minimize the thermal sensitivity of the output centroid wavelength for various values of the thermal sensitivity of the filter wavelength spectrum for the apparatus shown in FIG. 8 whereby the temperature-dependent filter has a Gaussian transmission spectrum.

FIG. 10 shows exemplary simulated source wavelength spectrum 111, filter wavelength spectra 112a, 112b, 112c, 112d, and 112e, and output wavelength spectra 113a, 113b, 113c, 113d, and 113e determined by the product of the source wavelength spectrum and filter wavelength spectra, at temperature $T_0$; and exemplary simulated source wavelength spectrum 114, filter wavelength spectra 115a, 115b, 115c, 115d, and 115e, and output wavelength spectra 116a, 116b, 116c, 116d, and 116e, determined by the product of the source wavelength spectrum and filter wavelength spectra, at temperature $T_1$, where $T_1 > T_0$; for light source apparatus 100 whereby source wavelength spectra 111 and 114 are characterized by Gaussian functions, filter wavelength spectra 112a, 112b, 112c, 112d, and 112e and 115a, 115b, 115c, 115d, and 115e are characterized by Gaussian functions, both source wavelength spectrum 111 and each of filter wavelength spectra 112a, 112b, 112c, 112d, and 112e have a maximum at 1550 nm at $T_0$, and $FWHM_{SOURCE}$ is 33 nm (typical for FOG applications using SLDs or REDSLSs). The FWHM spectral characteristic of each filter wavelength spectrum 112a, 112b, 112c, 112d, and 112e is configured to minimize the thermal sensitivity of the output centroid wavelength of output light 106 for filter wavelength spectrum sensitivities $\alpha_{FILTER}$ of $-0.125$ nm/° C., $-0.25$ nm/° C., $-0.5$ nm/° C., $-1$ nm/° C., and $-2$ nm/° C., respectively.

Figure 11:
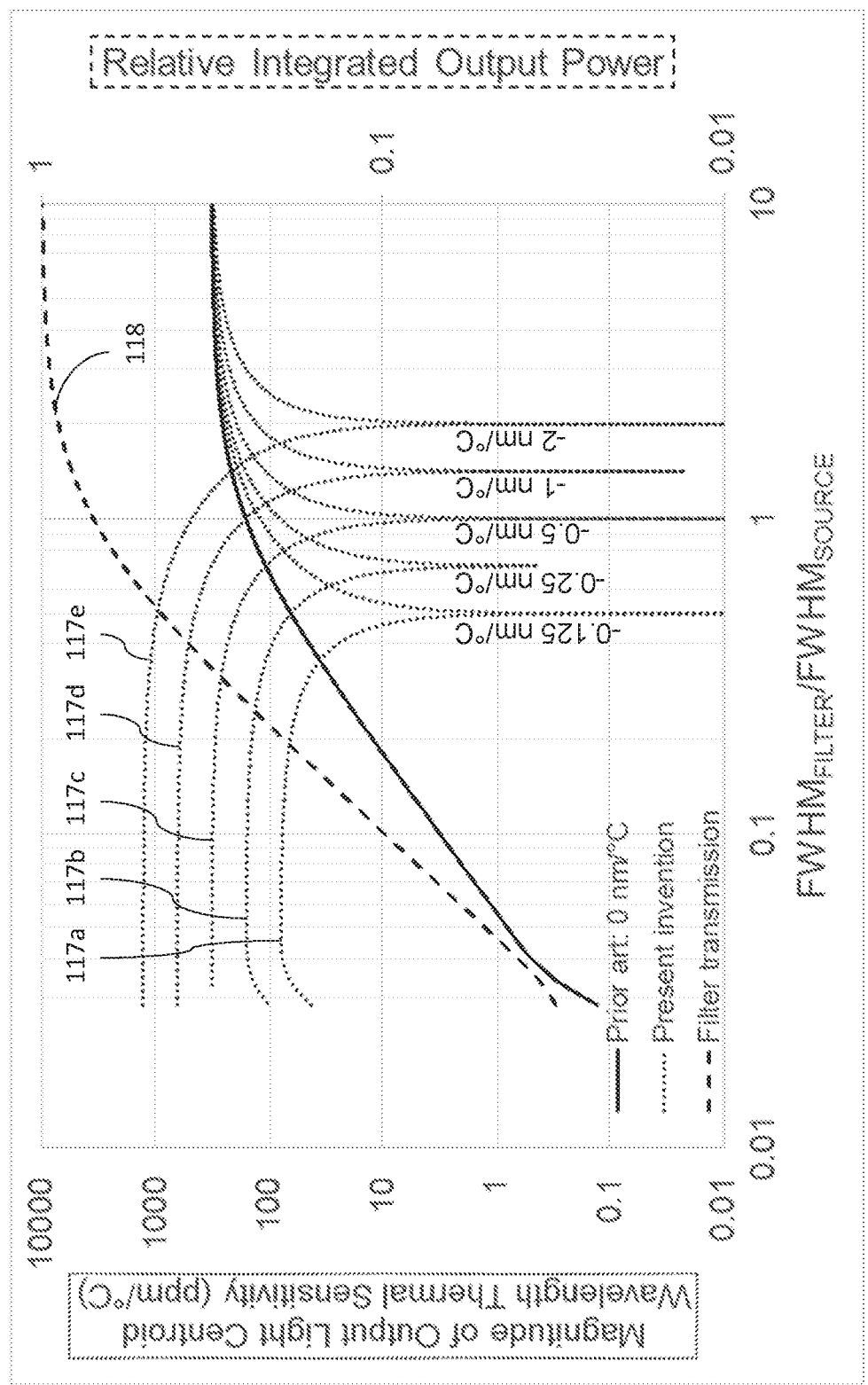
FIG. 11 is a graph showing a simulated dependence of the thermal sensitivity of the output light centroid wavelength and the integrated optical power on the ratio of the filter width to the source width for different thermal sensitivities of the temperature-dependent filter wavelength spectrum given the spectra shown in FIG. 10.

FIG. 11 shows a simulated dependence of the thermal sensitivity $\alpha_{OUTPUT}$ 117a, 117b, 117c, 117d, and 117e of the output centroid wavelength of output light 106 between $T_0$ and $T_1$ (solid curve), and a simulated dependence of the relative integrated output power 118 of output light 106 averaged over a temperature range of 1° C. (dashed curve), on the ratio of $FWHM_{FILTER}$ of filter spectra 112a, 112b, 112c, 112d, and 112e to $FWHM_{SOURCE}$ of source spectra 111 and 114 corresponding to the spectra shown in FIG. 10, whereby the inherent thermal sensitivity $\alpha_{SOURCE}$ of the centroid wavelength of source 103 is +0.5 nm/° C. or +323 ppm/° C. (typical for SLDs).

It is evident in FIG. 11 that for given characteristics of the emission spectrum, for example $FWHM_{SOURCE}$, of source 103 and for given inherent thermal sensitivity of the centroid wavelength of the source wavelength spectrum of source 103, the thermal sensitivity of the output centroid wavelength of output light 106 can be minimized (i.e., such that centroid wavelength is stabilized with respect to ambient temperature fluctuations) for appropriate combinations of the characteristics of the filter wavelength spectrum, for example $FWHM_{FILTER}$, of filter 105 and magnitude of the thermal sensitivity of the filter wavelength spectrum of filter 105 when the sign of the thermal sensitivity of the filter wavelength spectrum of filter 105 is opposite to the sign of the inherent thermal sensitivity of the centroid wavelength of the source wavelength spectrum of source 103.

In some cases, the thermal sensitivity of the centroid wavelength of output light 106 may be minimized when the magnitude of the thermal sensitivity of the filter wavelength spectrum is approximately equal in magnitude to the thermal sensitivity of the centroid wavelength of the source wavelength spectrum. Furthermore, in many cases the thermal sensitivity of the centroid wavelength of the source wavelength spectrum is positive in sign, so the filter can be configured to have a thermal sensitivity of the filter wavelength spectrum that is negative sign such that the thermal sensitivity of the output centroid wavelength may be minimized passively. However, embodiments also include cases for which the thermal sensitivity of the centroid wavelength of the source wavelength spectrum is negative in sign, and the thermal sensitivity of the filter wavelength spectrum that is positive in sign is appropriate for passive stabilization of the output centroid wavelength in those cases.

Moreover, in view of this disclosure, a person of ordinary skill in the art will understand how filter parameters, including filter spectral characteristics and thermal sensitivity magnitude and sign, may be iteratively changed, in view of a given source spectrum, to determine the best filter parameters for minimized thermal sensitivity of the output centroid wavelength. Modelling software can facilitate such iterative calculations. FIGS. 10 and 11, for example, illustrate results of iterative calculations to configure filter parameters to minimize the thermal sensitivity of the output centroid wavelength and to maximize relative integrated output power.

Figure 12:
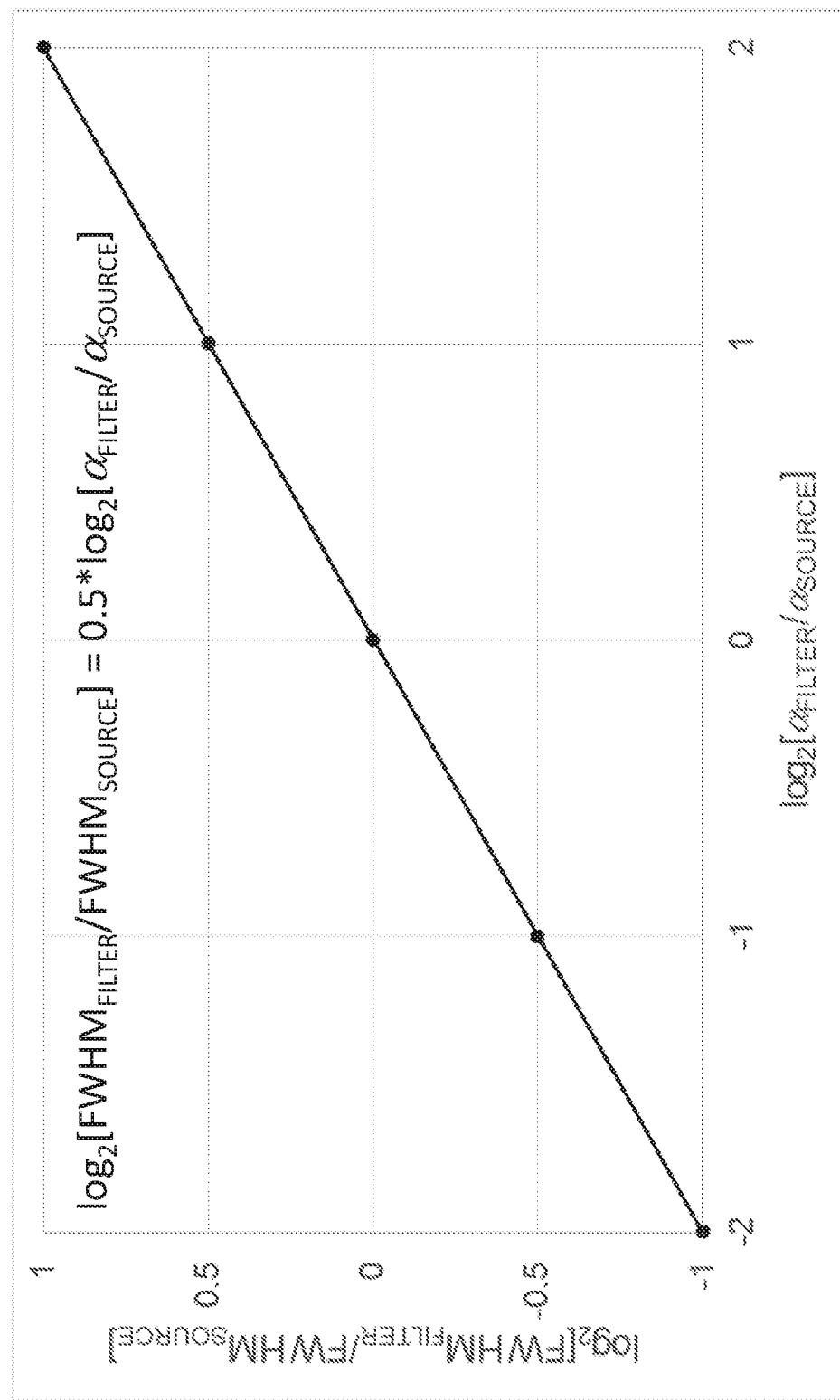
FIG. 12 shows a plot of $\log_2$ [$FWHM_{FILTER}$/$FWHM_{SOURCE}$] vs. $\log_2[\alpha_{FILTER}/\alpha_{SOURCE}]$ for the simulated optimal ratios of the filter width to the source width for the different thermal sensitivities of the temperature-dependent filter wavelength spectrum shown in FIG. 11.

FIG. 12 shows a plot of $\log_2 [FWHM_{FILTER}/FWHM_{SOURCE}]$ vs. $\log_2[\alpha_{FILTER}/\alpha_{SOURCE}]$ for the simulated optimal ratios of $FWHM_{FILTER}$ to $FWHM_{SOURCE}$ for the different thermal sensitivities of the filter wavelength spectrum $\alpha_{FILTER}$ of filter 105 shown in FIG. 11. The plot depicts the relationship $\log_2 [FWHM_{FILTER}/FWHM_{SOURCE}] = 0.5*\log_2[\alpha_{FILTER}/\alpha_{SOURCE}]$. Such a relationship may be applied to optimize the ratio of $FWHM_{FILTER}/FWHM_{SOURCE}$ for any given thermal sensitivity of the filter wavelength spectrum of filter 105.

Figure 13:
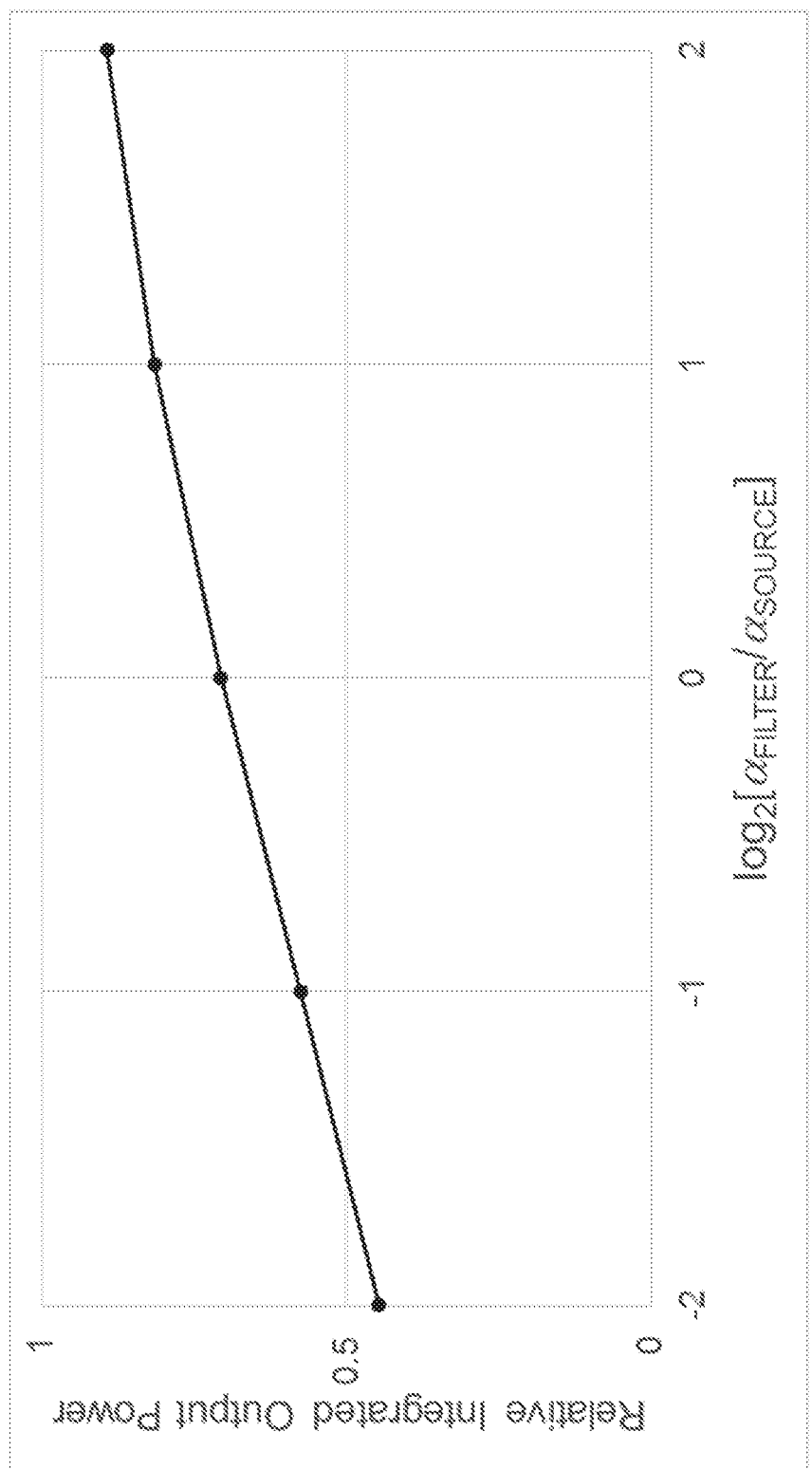
FIG. 13 shows a plot of relative integrated output power vs. $\text{Log}_2$ [Abs(Filter centroid wavelength thermal sensitivity)] for the simulated optimal ratios of the filter width to the source width for the different thermal sensitivities of the temperature-dependent filter wavelength spectrum shown in FIG. 11.

FIG. 13 shows a plot of relative integrated output power vs. $\log_2[\alpha_{FILTER}/\alpha_{SOURCE}]$ for the simulated optimal ratios of $FWHM_{FILTER}$ to $FWHM_{SOURCE}$ for the different thermal sensitivities of the filter wavelength spectrum $\alpha_{FILTER}$ of filter 105 shown in FIG. 11. An advantage of embodiments encompassed by the present disclosure is evident from FIG. 13 in that the thermal sensitivity $\alpha_{OUTPUT}$ of the centroid wavelength of output light 106 can be minimized while the reduction of integrated output power is limited to only 0.45× to 0.89× over the range −0.125 nm/° C. <$\alpha_{FILTER}$<−2 nm/° C.

Figure 14:
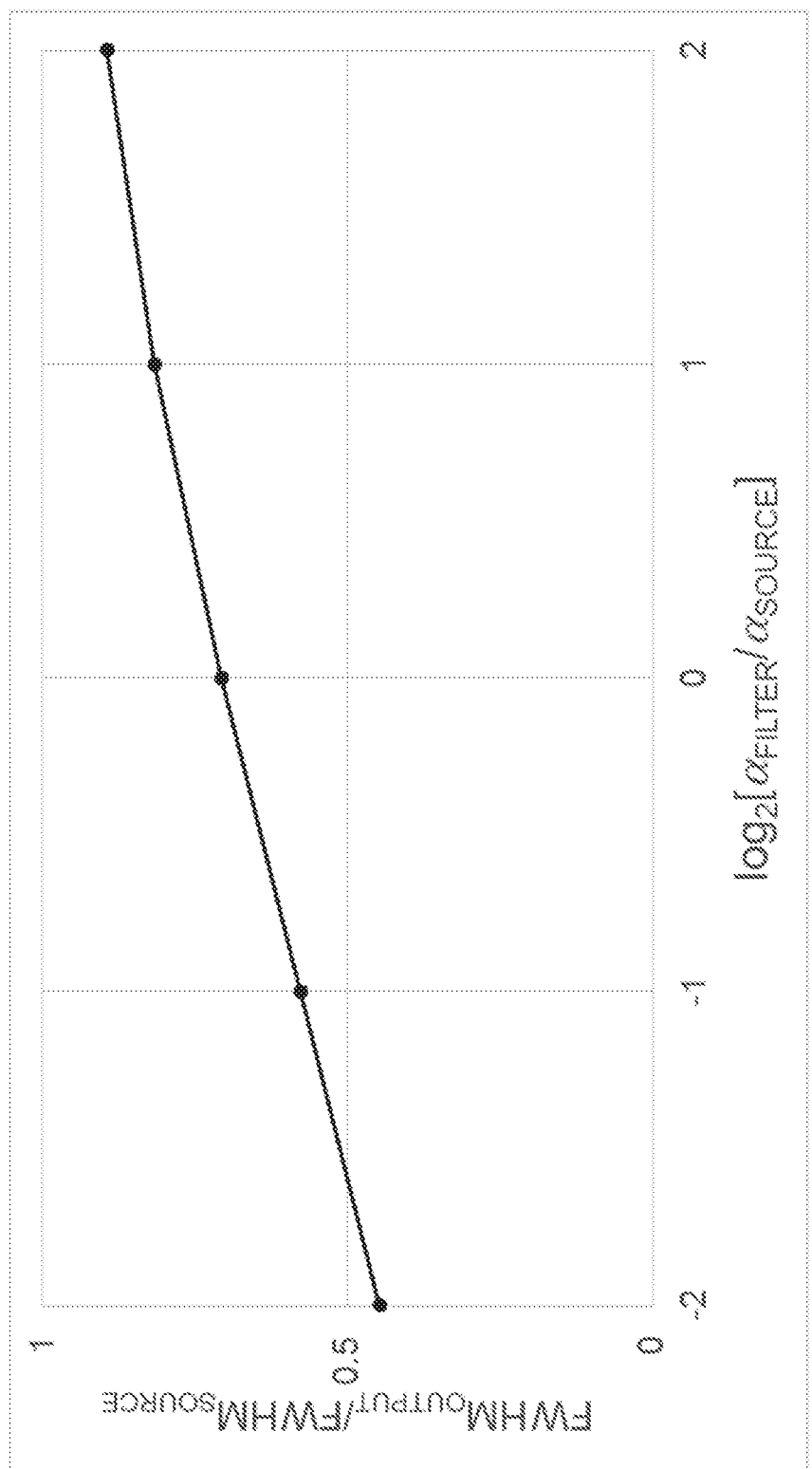
FIG. 14 shows a plot of $FWHM_{OUTPUT}$/$FWHM_{SOURCE}$ for the simulated optimal ratios of the filter width to the source width for the different thermal sensitivities of the temperature-dependent filter wavelength spectrum shown in FIG. 11.

FIG. 14 shows a plot of $FWHM_{OUTPUT}/FWHM_{SOURCE}$ vs. $\log_2 [\alpha_{FILTER}/\alpha_{SOURCE}]$, where $FWHM_{OUTPUT}$ is the full width at half maximum of the output wavelength spectra 116a, 116b, 116c, 116d, and 116e, for the simulated optimal ratios of $FWHM_{FILTER}$ to $FWHM_{SOURCE}$ for the different thermal sensitivities of filter wavelength spectrum $\alpha_{FILTER}$ of filter 105 shown in FIG. 11. Another advantage of embodiments described herein is evident from FIG. 14 in that the thermal sensitivity $\alpha_{OUTPUT}$ of the centroid wavelength of output light 106 can be minimized while the reduction of $FWHM_{OUTPUT}$ is limited to only 0.45× to 0.89× over the range −0.125 nm/° C. <$\alpha_{FILTER}$<−2 nm/° C.

Figure 15:
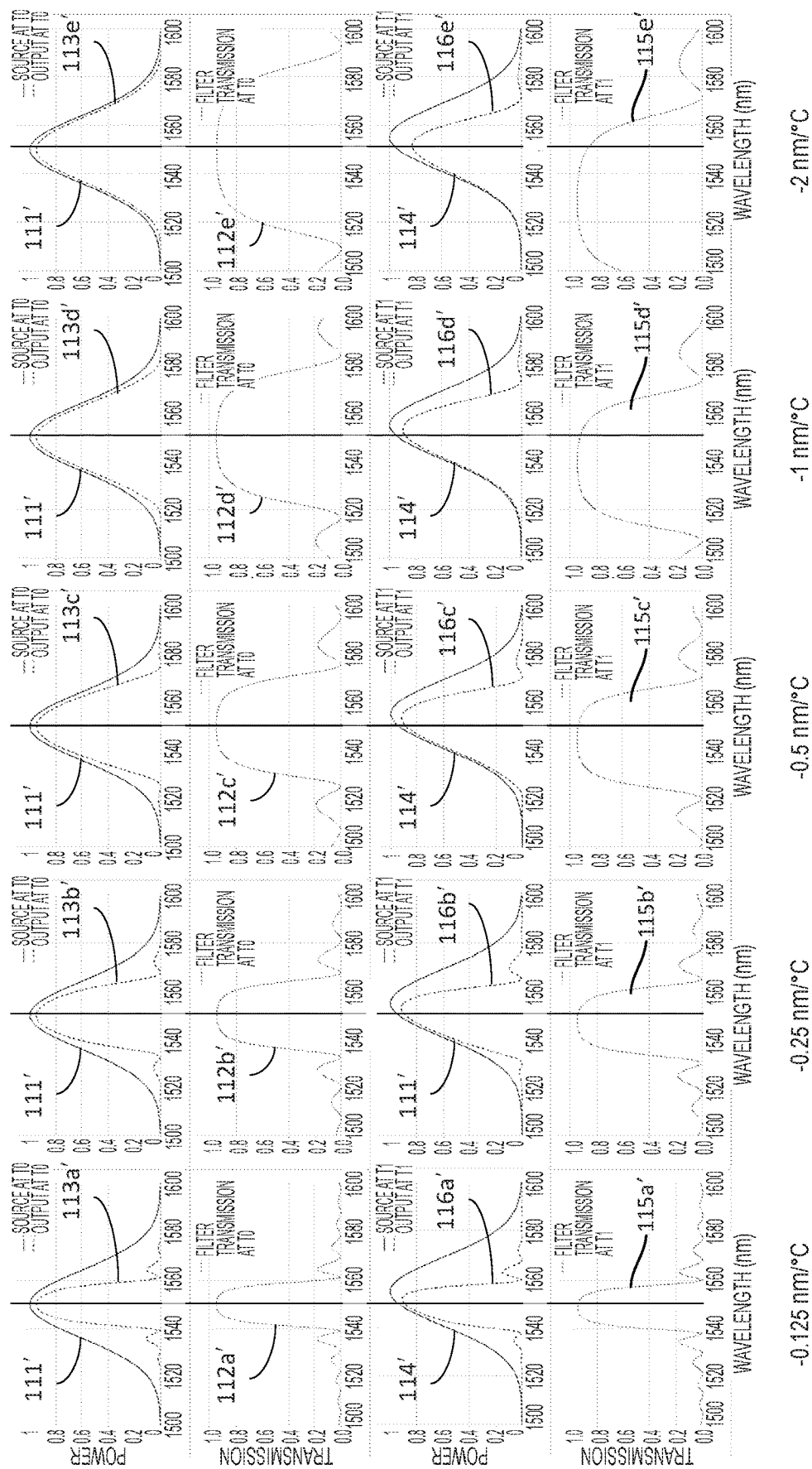
FIG. 15 shows the simulated source, filter, and output spectra with filter widths configured to minimize thermal sensitivity of the output centroid wavelength for various values of the thermal sensitivity of the filter wavelength spectrum for the apparatus shown in FIG. 8 whereby the temperature-dependent filter has a transmission spectrum characteristic of a Bragg grating.

FIG. 15 shows exemplary simulated source wavelength spectrum 111', filter wavelength spectra 112a', 112b', 112c', 112d', and 112e', and output wavelength spectra 113a', 113b', 113c', 113d', and 113e' determined by the product of the source wavelength spectrum and filter wavelength spectra, at temperature $T_0$; and exemplary simulated source wavelength spectrum 114', filter wavelength spectra 115a, 115b', 115c', 115d', and 115e, and output wavelength spectra 116a', 116b', 116c', 116d', and 116e', determined by the product of the source wavelength spectrum and filter wavelength spectra, at temperature $T_1$, where $T_1>T_0$; for light source apparatus 100 whereby source wavelength spectra 111' and 114' are characterized by Gaussian functions, filter wavelength spectra 112a', 112b', 112c', 112d', and 112e' and 115a, 115b', 115c', 115d', and 115e' are characterized by functions characteristic of a Bragg grating, both source wavelength spectrum 111' and each of filter wavelength spectra 112a, 112b', 112c', 112d', and 112e' have a maximum at 1550 nm at $T_0$, and $FWHM_{SOURCE}$ is 33 nm.

Figure 16:
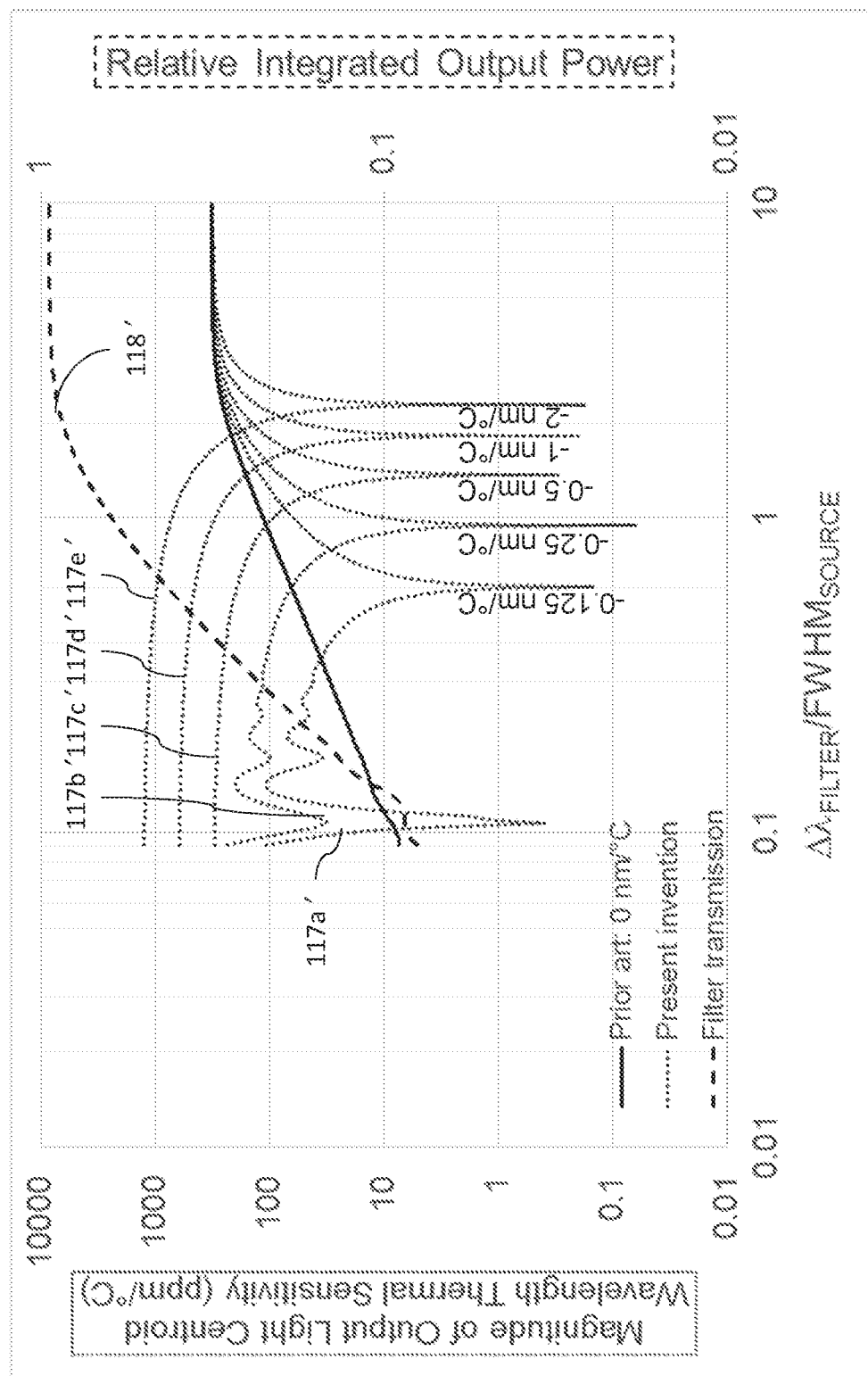
FIG. 16 shows a simulated dependence of the thermal sensitivity of the output light centroid wavelength and the integrated optical power on the ratio of the filter width to the source width for different thermal sensitivities of the temperature-dependent filter wavelength spectrum given the spectra shown in FIG. 15.

The width between the first zeros on either side of the maximum reflectivity ($\Delta\lambda_{FILTER}$) spectral characteristic of each filter wavelength spectrum 112a', 112b', 112c', 112d', and 112e' is configured to minimize the thermal sensitivity of the output centroid wavelength of output light 106 for filter wavelength spectrum sensitivities $\alpha_{FILTER}$ of −0.125 nm/° C., −0.25 nm/° C., −0.5 nm/° C., −1 nm/° C., and −2 nm/° C., respectively. FIG. 16 shows a simulated dependence of the thermal sensitivity $\alpha_{OUTPUT}$ 117a', 117b', 117c', 117d', and 117e' of the output centroid wavelength of output light 106 between $T_0$ and $T_1$ (solid curve), and a simulated dependence of the relative integrated output power 118' of output light 106 averaged over a temperature range of 1° C. (dashed curve), on the ratio of $\Delta\lambda_{FILTER}$ of filter wavelength spectra 112a, 112b', 112c', 112d', and 112e' to $FWHM_{SOURCE}$ of source wavelength spectra 111' and 114' corresponding to the wavelength spectra shown in FIG. 15, whereby the inherent thermal sensitivity $\alpha_{SOURCE}$ of the centroid wavelength of source 103 is +0.5 nm/° C. or +323 ppm/° C.

It is evident in FIG. 16 that for given characteristics of the emission wavelength spectrum, for example $FWHM_{SOURCE}$, of source 103 and for given inherent thermal sensitivity of the centroid wavelength of the source wavelength spectrum of source 103, the thermal sensitivity of the output centroid wavelength of output light 106 can be minimized, i.e., stabilized, for appropriate combinations of the characteristics of the filter wavelength spectrum, for example $\Delta\lambda_{FILTER}$, of filter 105 and magnitude of the thermal sensitivity of the filter wavelength spectrum of filter 105 when the sign of the thermal sensitivity of the filter wavelength spectrum of filter 105 is opposite to the sign of the inherent thermal sensitivity of the centroid wavelength of the source wavelength spectrum of source 103.

Figure 17:
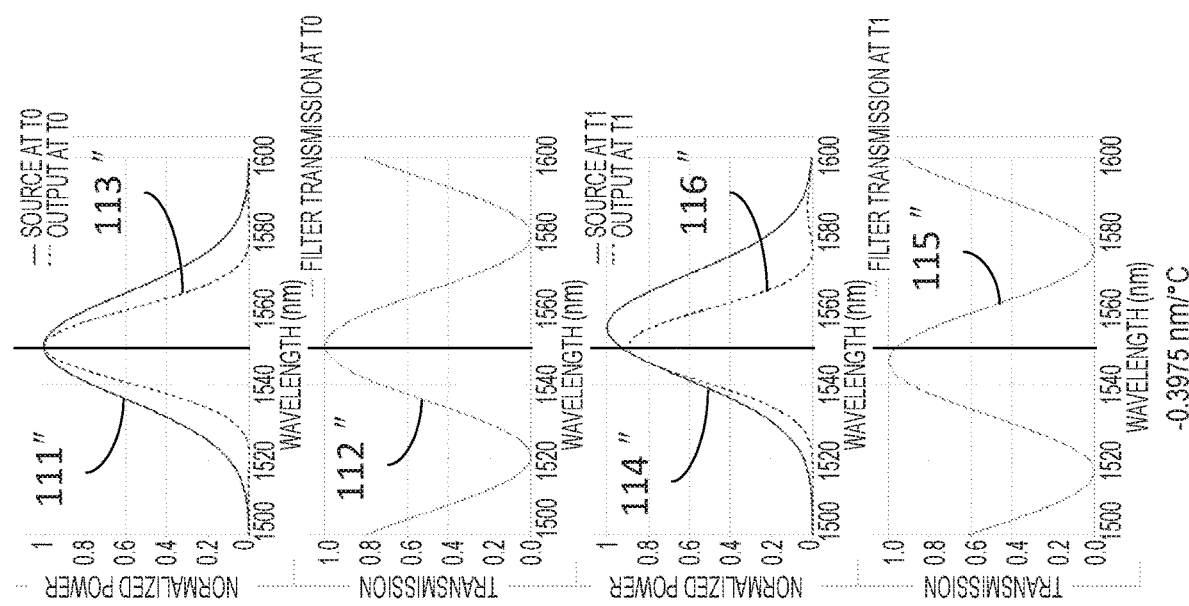
FIG. 17 shows the simulated source, filter, and output spectra with filter widths configured to minimize the thermal sensitivity of the output centroid wavelength for various values of thermal sensitivity of the filter wavelength spectrum for the apparatus shown in FIG. 8 whereby the temperature-dependent filter has a raised sinusoidal transmission spectrum.

FIG. 17 shows exemplary simulated source wavelength spectrum 111", filter wavelength spectrum 112", and output wavelength spectrum 113", determined by the product of the source wavelength spectrum and filter wavelength spectrum, at temperature $T_0$; and exemplary simulated source wavelength spectrum 114", filter wavelength spectrum 115", and output wavelength spectrum 116", determined by the product of the source wavelength spectrum and filter wavelength spectrum, at temperature $T_1$, where $T_1>T_0$; for light source apparatus 100 whereby source wavelength spectra 111" and 114" are characterized by Gaussian functions, filter wavelength spectra 112" and 115" are characterized by raised sinusoidal functions, both source wavelength spectrum 111" and filter wavelength spectrum 112" have a maximum at 1550 nm at $T_0$, and $FWHM_{SOURCE}$ is 33 nm.

The width as defined by one half of the free spectral range ($HFSR_{FILTER}$) of the raised sinusoidal function spectral characteristic of filter wavelength spectrum 112" is optimized to minimize the thermal sensitivity of the output centroid wavelength of output light 106 for the combination of $HFSR_{FILTER}=0.836*FWHM_{SOURCE}$ and thermal sensitivity of the filter wavelength spectrum $\alpha_{FILTER}$ −0.3975 nm/° C.

Figure 18:
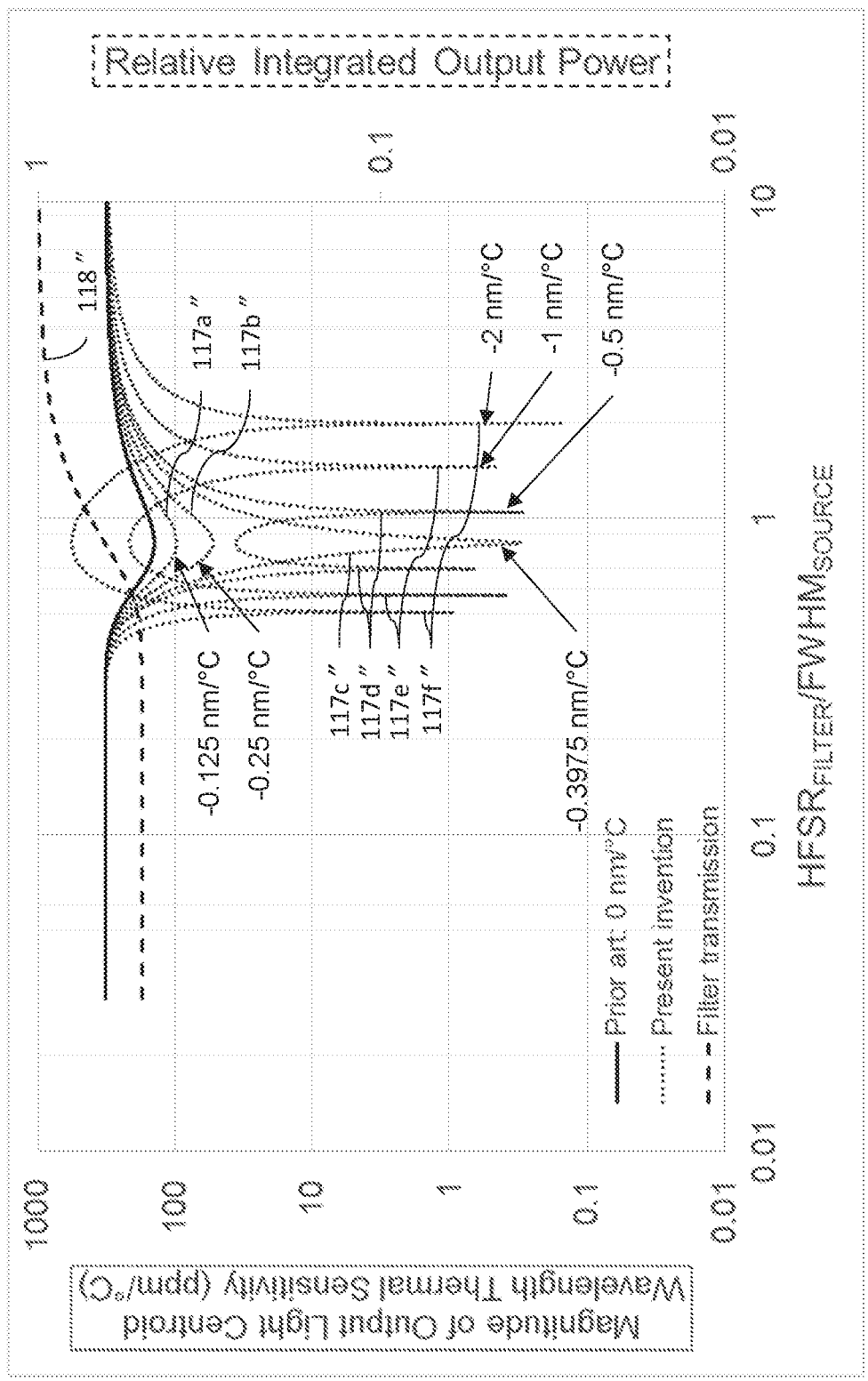
FIG. 18 shows a simulated dependence of the thermal sensitivity of the output light centroid wavelength and the integrated optical power on the ratio of the filter width to the source width for different thermal sensitivities of the temperature-dependent filter wavelength spectrum given the spectra shown in FIG. 17.

FIG. 18 shows a simulated dependence of the thermal sensitivity $\alpha_{OUTPUT}$ 117a", 117b", 117c", 117d", 117e", and 117f" of the output centroid wavelength of output light 106 between $T_0$ and $T_1$ (solid curve), and a simulated dependence of the relative integrated output power 118" of output light 106 averaged over a temperature range of 1° C. (dashed curve), on the ratio of $HFSR_{FILTER}$ of filter wavelength spectrum 112" to $FWHM_{SOURCE}$ of source wavelength spectra 111" and 114" corresponding to the wavelength spectra shown in FIG. 17, whereby the inherent thermal sensitivity $\alpha_{SOURCE}$ of the centroid wavelength of source 103 is +0.5 nm/° C. or +323 ppm/° C.

It is evident in FIG. 18 that for given characteristics of the emission wavelength spectrum, for example $FWHM_{SOURCE}$, of source 103 and for given inherent thermal sensitivity of the centroid wavelength of source 103, the thermal sensitivity of the output centroid wavelength of output light 106 can be minimized, and therefore stabilized, for appropriate combinations of the characteristics of the filter wavelength spectrum, for example $HFSR_{FILTER}$, of filter 105 and magnitude of the thermal sensitivity of the filter wavelength spectrum of filter 105 when the sign of the thermal sensitivity of the filter wavelength spectrum of filter 105 is opposite to the sign of the inherent thermal sensitivity of the centroid wavelength of the source wavelength spectrum of source 103. In particular, for the combination of a source wavelength spectrum characterized by a Gaussian function and a filter wavelength spectrum characterized by a raised sinusoidal function, the thermal sensitivity of the output centroid wavelength of output light 106 is minimized for one particular value of the ratio of $HFSR_{FILTER}$ to $FWHM_{SOURCE}$, in this case $0.836*FWHM_{SOURCE}$ given the inherent thermal sensitivity of the centroid wavelength of the source wavelength spectrum of source 103, whereby this minimization is enhanced as the thermal sensitivity of the filter wavelength spectrum of filter 105 becomes more negative in sign until a certain value, in this case −0.3975 nm/° C., for which the minimization of the thermal sensitivity of the output centroid wavelength of the output wavelength spectrum output light 106 is optimized, and whereby the optimal ratio of $HFSR_{FILTER}$ to $FWHM_{SOURCE}$ becomes dual-valued as the thermal sensitivity of the filter wavelength spectrum of filter 105 becomes even more negative beyond that certain value.

Although the exemplary source and filter wavelength spectra shown in FIGS. 10, 15 and 17 depict specific spectral characteristics such as peak wavelength, spectral width and generally spectral shape or functional form, embodiments within the scope of the present disclosure are not limited to any particular set of spectral characteristics. For example, source and filter wavelength spectra may be non-Gaussian, non-symmetric, etc. As such, a further advantage of embodiments is that the filter optimization described herein to minimize thermal sensitivity of output centroid wavelength, maximize relative integrated output power, or both may be applied in the case of particular known source wavelength spectrum.

Figure 19:
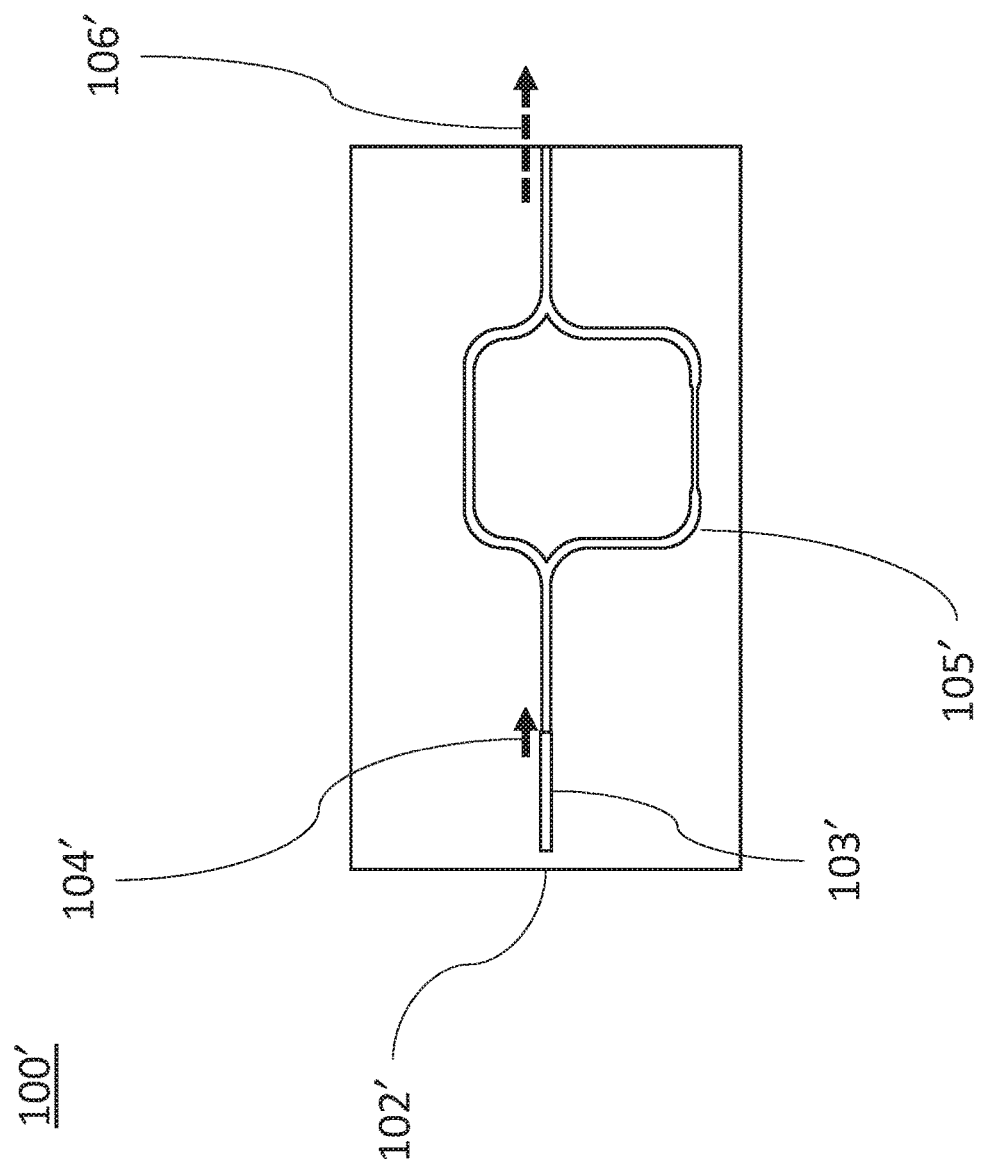
FIG. 19 is a schematic view of the wavelength-stabilized light source apparatus of FIG. 8 including an asymmetric Mach-Zehnder interferometer (MZI) structure according to a further embodiment.

Referring to FIG. 19, according to a further embodiment, a broadband optical filter 105' of passively wavelength-stabilized broadband light source apparatus 100' may include at least one asymmetric Mach-Zehnder interferometer (MZI) structure whose wavelength spectrum is known to be characterized by a raised sinusoidal function. Source 103' and filter 105' may include discrete components in optical communication, for example via optical fiber.

As an alternative to discrete components, source 103' and filter 105' may include features of an integrated photonic device, for example an integrated photonic device including waveguides formed by patterning features into combinations of indium phosphide layers and quarternary indium gallium arsenide phosphide layers epitaxially grown on an indium phosphide substrate using deposition processes such as low-pressure metal organic chemical vapor deposition as known in the art.

As a further alternative, source 103' and filter 105' may include separate components wafer-bonded or butt-coupled together, for example an indium phosphide SLD source bonded or butt-coupled to a filter including waveguides formed by patterning features into silicon or silicon nitride films as known in the art. An important advantage of integrated photonic devices, wafer-bonded devices and butt-coupled devices is that the temperature of source 103' and filter 105' may be matched with excellent precision due to their close proximity.

Figure 20:
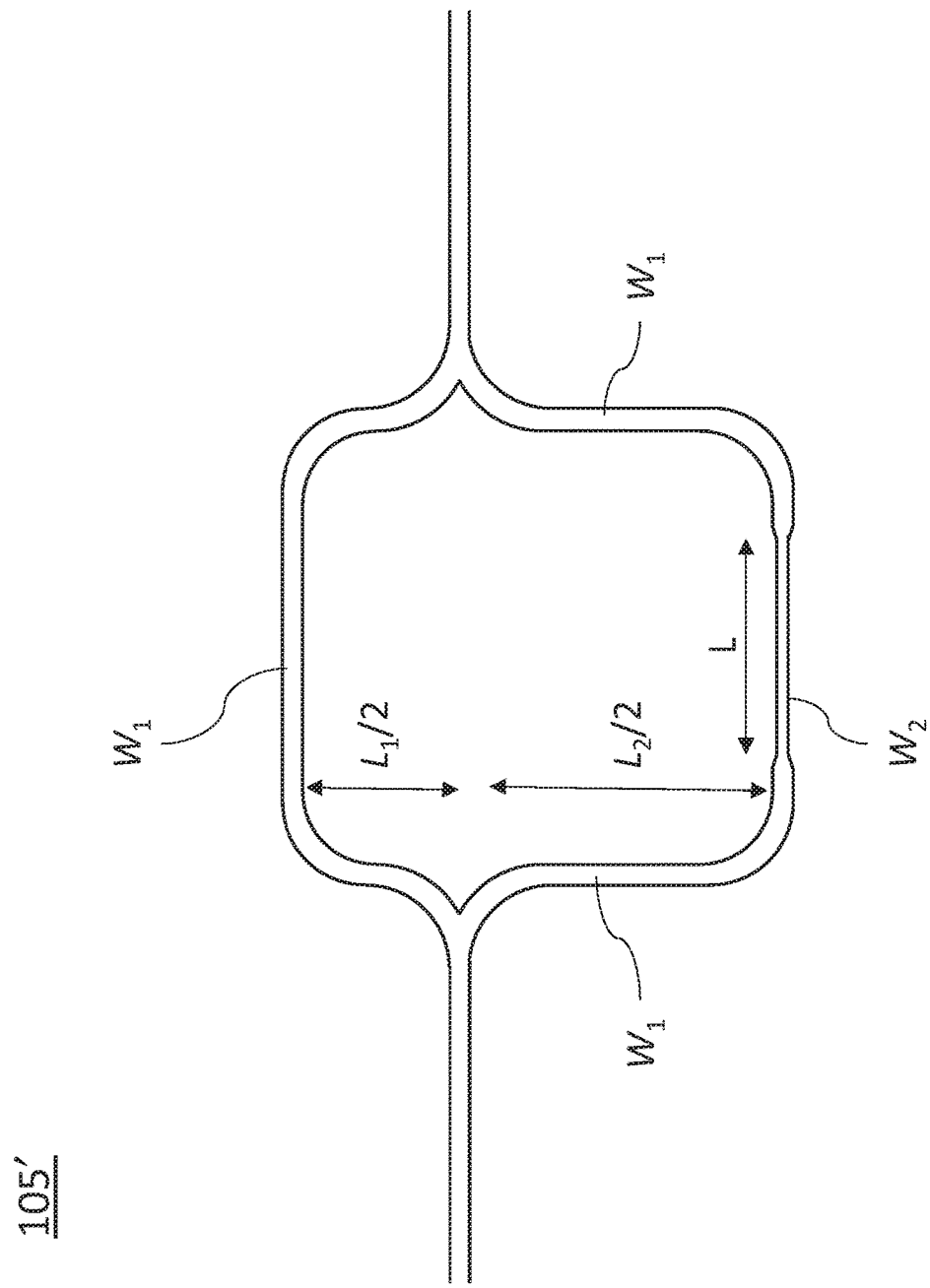
FIG. 20 shows a detail view of the asymmetric MZI structure of FIG. 19.

FIG. 20 shows a detail view of asymmetric MZI structure 105' shown in FIG. 19. Filter 105' works on the principle that the guided mode encounters different changes of effective mode index $n_{eff}$ with temperature T, i.e., different $\partial n_{eff}/\partial T$, in the two arms of the asymmetric MZI structure, induced by different waveguide widths, and by careful design of the arm lengths the relative temperature sensitivity between the arms is set to achieve an overall thermal sensitivity of the filter wavelength spectrum configured to minimize the thermal sensitivity of the output centroid wavelength.

The asymmetric MZI structure includes two Y-junctions that respectively split into and combine two arms. Alternatively the two arms of filter 105' may be coupled using directional couplers or multimode interferometers. While one of the arms propagates a length of L horizontally and $L_1$ vertically with constant waveguide width of $W_1$, the other arm propagates a length $L_2$ with waveguide width of $W_1$ and tapers down to a width of $W_2$ for length L, where $W_2<W_1$. The overall thermal sensitivity of the filter wavelength spectrum of filter 105' can be derived from the temperature dependence of the net optical path length, given by the difference in propagating lengths in the two arms ($\Delta L$) with a given $n_{eff}$ and the difference in mode indices ($\Delta n_{eff}$) over a fixed length (L). It can be expressed as Eq. (1):

$$m\lambda_0 = n_{eff} \cdot \Delta L + \Delta n_{eff} \cdot L$$

Here $\Delta L = L_2 - L_1$, $\Delta n_{eff} = n_{eff}(W_2) - n_{eff}(W_1)$ and m is the interference order at a given wavelength ($\lambda_0$). m can be chosen to be an integer to give constructive interference at that wavelength, or a half-integer to give destructive interference. Alternatively the different $\partial n_{eff}/\partial T$ in the two arms of the MZI structure may be induced by a difference in core and/or cladding materials having different refractive indices. Due to waveguide dispersion (the change in $n_{eff}$ with wavelength $\lambda$, i.e., $\partial n_{eff}/\partial \lambda$), the interference order is modified as expressed by Eq. (2):

$$M = m - \Delta L \cdot \frac{\partial n_{eff}}{\partial \lambda} - L \cdot \frac{\partial (\Delta n_{eff})}{\partial \lambda}$$

The thermal sensitivity of any minima point of the spectrum ($\lambda_0$) can then be expressed as Eq. (3):

$$\frac{\Delta \lambda_0}{\Delta T} = \frac{\Delta L \cdot \frac{\partial n_{eff}}{\partial \lambda} + L \cdot \frac{\partial (\Delta n_{eff})}{\partial \lambda}}{M}$$

From Eq. (3) it can be shown that if $\Delta L$ and $\Delta n_{eff}$ are chosen appropriately, the minima shift can be set to achieve an overall thermal sensitivity of the filter wavelength spectrum configured to minimize the thermal sensitivity of the output centroid wavelength.

Figure 21:
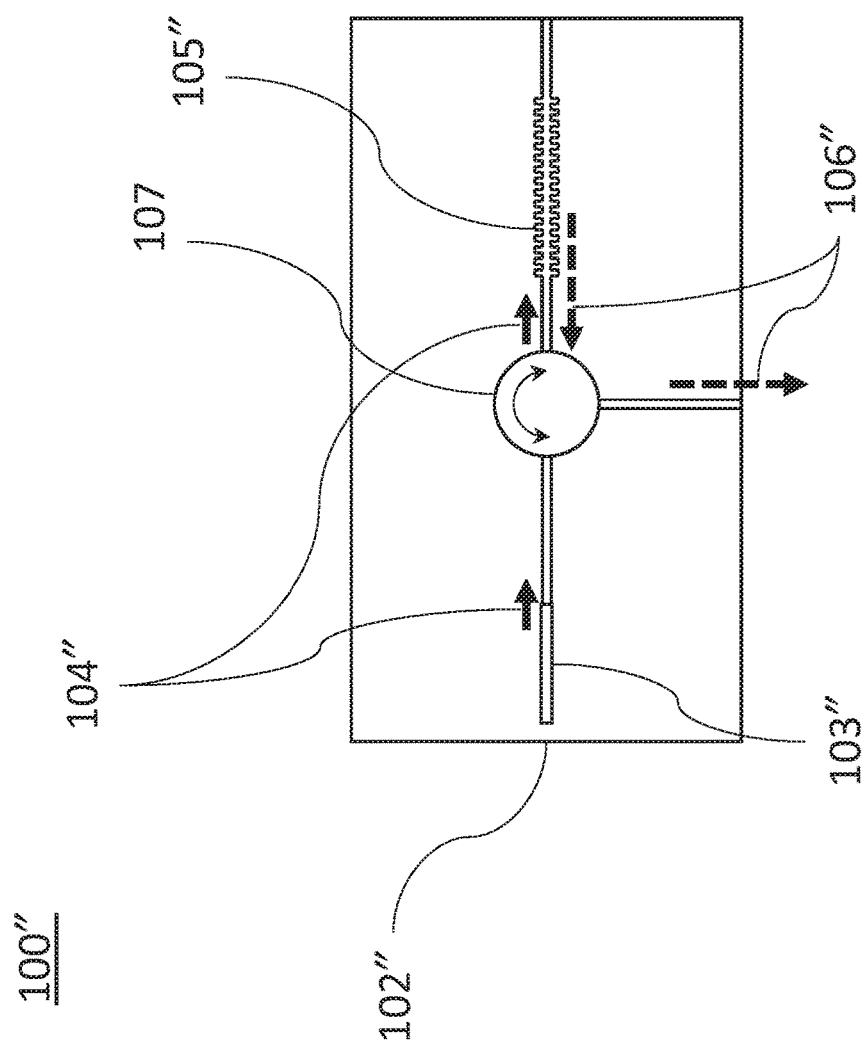
FIG. 21 is a schematic view of the apparatus of FIG. 8, wherein the broadband optical filter includes a waveguide Bragg grating structure according to a further embodiment.

Referring to FIG. 21, according to a further embodiment, a broadband optical filter 105" of passively wavelength-stabilized broadband light source apparatus 100" may include at least one waveguide Bragg grating structure. Emission light 104" is shown to be delivered to filter 105" by circulator 107, and output light 106" is shown to be reflected from filter 105" and delivered by circulator 107 to an output of apparatus 100". Source 103" and filter 105" may include discrete components in optical communication, for example via optical fiber. Alternatively source 103" and filter 105" may include features of an integrated photonic device. Alternatively source 103" and filter 105" may include separate components wafer-bonded or butt-coupled together. An important advantage of integrated photonic devices, wafer-bonded devices and butt-coupled devices is that the temperature of source 103" and filter 105" may be easily matched with excellent precision due to their close proximity.

Figure 22:
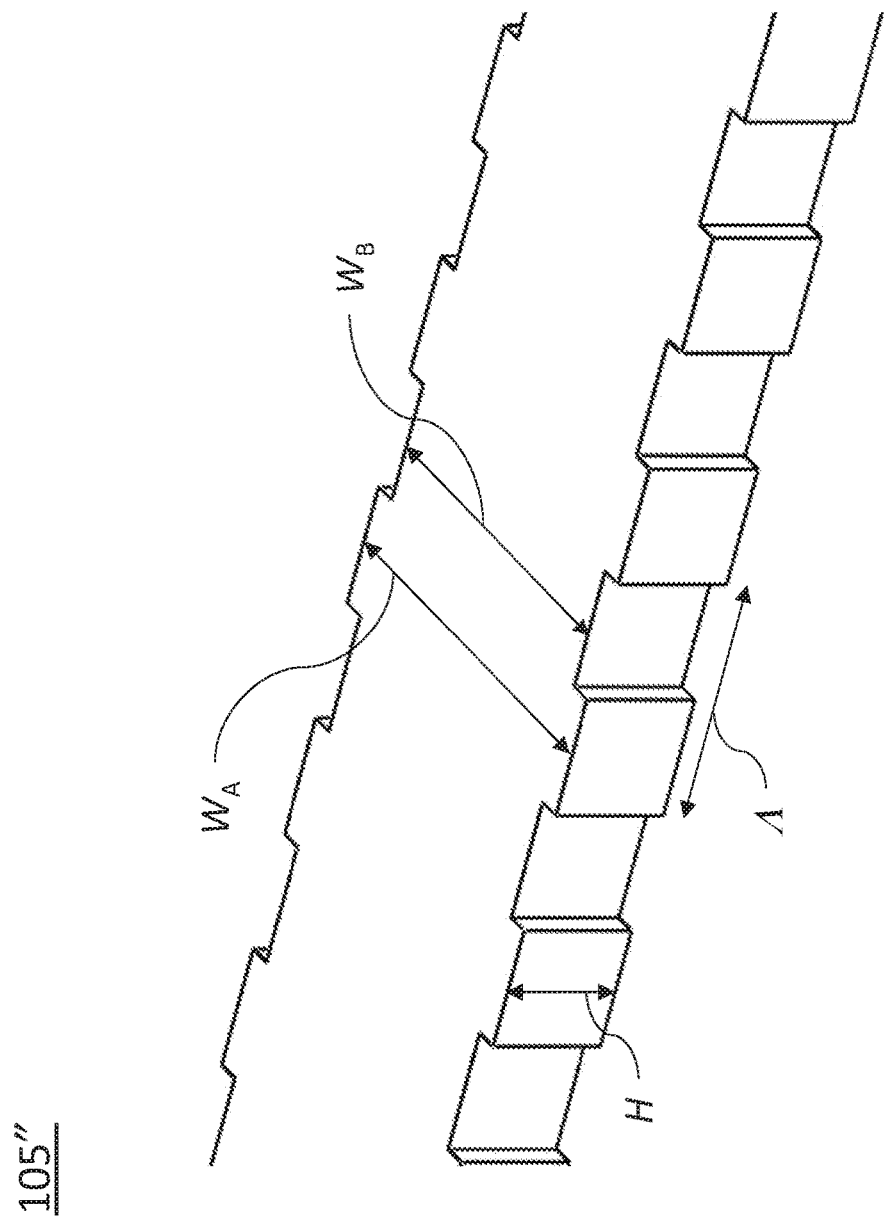
FIG. 22 shows a detail view of the waveguide Bragg grating structure of FIG. 21.

FIG. 22 shows a detail view of filter 105" shown in FIG. 21. In the embodiment shown the waveguide Bragg grating structure includes a planar core material with refractive index $n_{core}$ having height H and periodically alternating segments with widths $W_A$ and $W_B$, where $W_B<W_A$, with periodicity A; surrounded by at least one cladding material with refractive index $n_{cladding}$, where $n_{cladding}<n_{core}$. Alternatively filter 105" may include a fiber Bragg grating (FBG). The Bragg wavelength $\lambda_B$, which is the wavelength for peak reflectivity of the filter reflection spectrum such as 112a', 112b', 112c', 112d', or 112e, is a function of the effective mode index $n_{eff}$ and the grating period A as expressed by Eq. (4):

$$\lambda_B = 2 n_{eff} A$$

Eq. (4) may be differentiated with respect to temperature T to obtain the variation of $\lambda_B$ with respect to T as expressed by Eq. (5):

$$\frac{\partial \lambda_B}{\partial T} = 2\left(\Lambda \cdot \frac{\partial n_{\text{eff}}}{\partial T} + n_{\text{eff}} \cdot \frac{\partial \Lambda}{\partial T}\right)$$

From Eq. (5) it can be shown that if $n_{\text{eff}}$, $$\Lambda, \frac{\partial n_{\text{eff}}}{\partial T}, \text{ and } \frac{\partial \Lambda}{\partial T}$$

are chosen appropriately, the $\lambda_B$ shift can be set to achieve an overall thermal sensitivity of the filter wavelength spectrum configured to minimize the thermal sensitivity of the output centroid wavelength. $n_{\text{eff}}$ and the effective thermo-optic coefficient $$\frac{\partial n_{\text{eff}}}{\partial T}$$

are functions of $n_{core}$ and $n_{cladding}$. When the inherent centroid wavelength thermal sensitivity of source 103' is greater than zero, as is typical for SLDs and REDSLSs, embodiments require that $$\frac{\partial \lambda_B}{\partial T}$$

be less than zero, $$\text{so } \Lambda \cdot \frac{\partial n_{\text{eff}}}{\partial T} + n_{\text{eff}} \cdot \frac{\partial \Lambda}{\partial T}$$

must be less than zero and hence $$\frac{\partial n_{\text{eff}}}{\partial T}$$

must be less than zero and/or $$\frac{\partial \Lambda}{\partial T}$$

must be less than zero. Anatase titanium dioxide ($TiO_2$) is an example of a material known to have negative thermooptic coefficient of about $-4.9 \times 10^{-5}$ $K^{-1}$, so core or cladding material including anatase $TiO_2$ can be used to design a Bragg grating with $$\frac{\partial \lambda_B}{\partial T} < 0.$$

Other examples of materials known to have negative thermooptic coefficient include certain glasses such as certain phosphate glasses and fluoride glasses, certain polymers such as polymethylmethacrylate (PMMA), polydimethylsiloxane (PDMS), polyimide, and benzocyclobutene (BCB), and organic-inorganic hybrid materials such as materials of 3-acryloxypropyl trimethoxysilane and 4,4'-(hexafluoroisopropylidene)diphenol. These other materials, therefore, can also be used for a core or cladding in embodiment devices. Furthermore, a stand-alone optical waveguide Bragg grating structure, even separate from the broadband source stabilization apparatus and methods described herein, may include an optical core and an optical cladding surrounding the core, and at least one of the optical core and optical cladding can include $TiO_2$ or another example material above having a negative thermooptic coefficient. In certain embodiments, the optical waveguide Bragg grating structure can be a broadband optical filter characterized by a filter wavelength spectrum having thermal sensitivity of the filter wavelength spectrum that is negative in sign.

Figure 23:
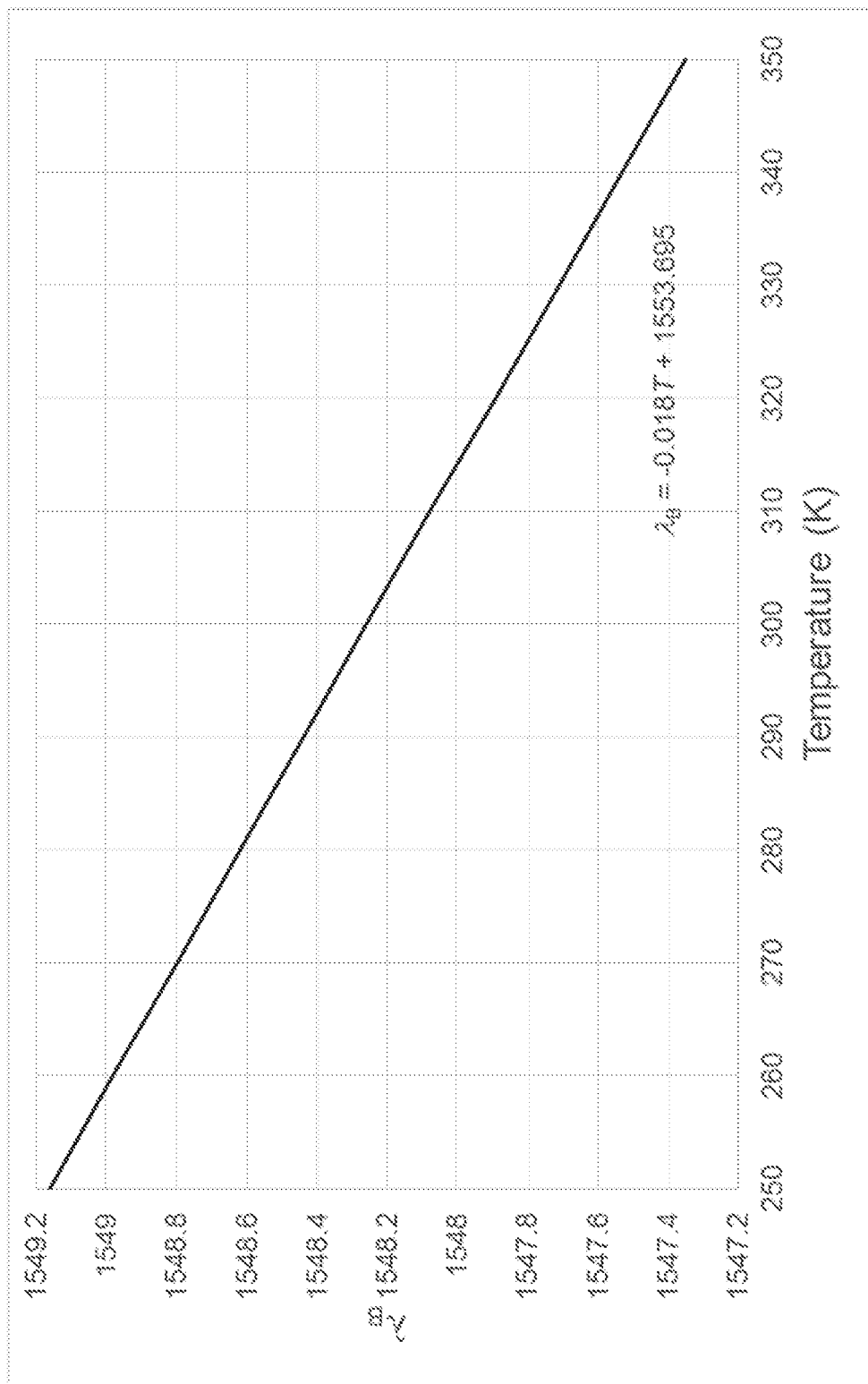
FIG. 23 shows a plot of Bragg wavelength vs. temperature for the Bragg grating structure of FIGS. 21 and 22.

FIG. 23 shows a plot of $\lambda_B$ vs. T depicting the negative thermal sensitivity of $-0.018$ nm/K for the filter wavelength spectrum of filter 105" shown in FIGS. 21 and 22 where, by way of example, $W_A=800$ nm, $W_B=700$ nm, $H=220$ nm, $\Lambda=458$ nm, the core material is anatase $TiO_2$ having a refractive index of 2.41 at 1550 nm and a thermo-optic coefficient of $-4.9 \times 10^{-5}$ $K^{-1}$, and the cladding material surrounding the core is silicon dioxide ($SiO_2$) having a refractive index of 1.444 at 1550 nm and a thermo-optic coefficient of $1 \times 10^{-5}$ $K^{-1}$.

Figure 24:
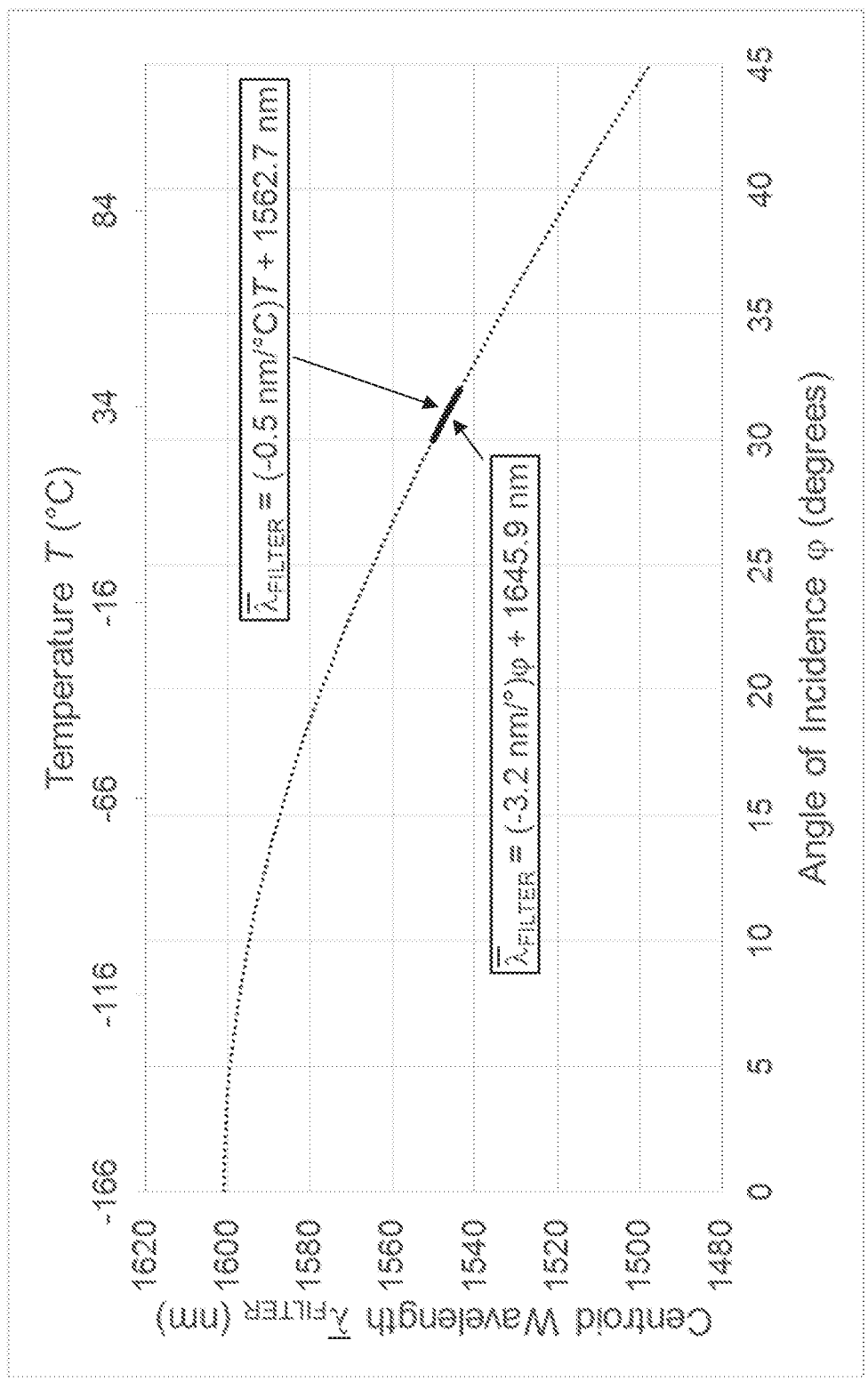
FIG. 24 shows the simulated dependence of the filter wavelength spectrum on the angle of incidence for an interference filter according to another embodiment.

According to a different further embodiment, a broadband optical filter 105''' may include at least one interference filter. It is known in the art that the wavelength spectrum of an interference filter is dependent upon the angle of the incident light with respect to the multilayer interference coating. This dependence to a near approximation is described by $$\sqrt{1 - \left(\frac{\sin \varphi}{N}\right)^2}$$

where $\varphi$ is the angle of incidence, and N is the effective refractive index of the multilayer interference coating. The effective refractive index of the coating is determined by the coating materials used and the sequence of thin-film layers in the coating. FIG. 24 shows the simulated dependence for an interference filter with peak wavelength 1601 nm and $N=2$. Tilting the filter with respect to the light path axis causes the transmission spectrum of the filter to shift to shorter wavelengths. In particular, over an angle of incidence range of $30° < \varphi < 32°$, the corresponding peak wavelength spans 1550 nm $> \lambda_{FILTER} > 1544$ nm and is approximated by a linear dependence given by $(-3.2$ nm/°$) \varphi + 1645.9$ nm. The secondary horizontal axis shown at the top of the plot in FIG. 24 indicates an exemplary temperature T dependence desirable for a filter whose peak wavelength is 1550 nm at 25° C. and whose temperature sensitivity $\alpha_{FILTER}$ is $-0.5$ nm/° C. in the temperature range 25° C. $<T<38°$ C., which is approximated by a linear dependence given by $(-0.5$ nm/° C.$)T + 1562.7$ nm.

Figure 25:
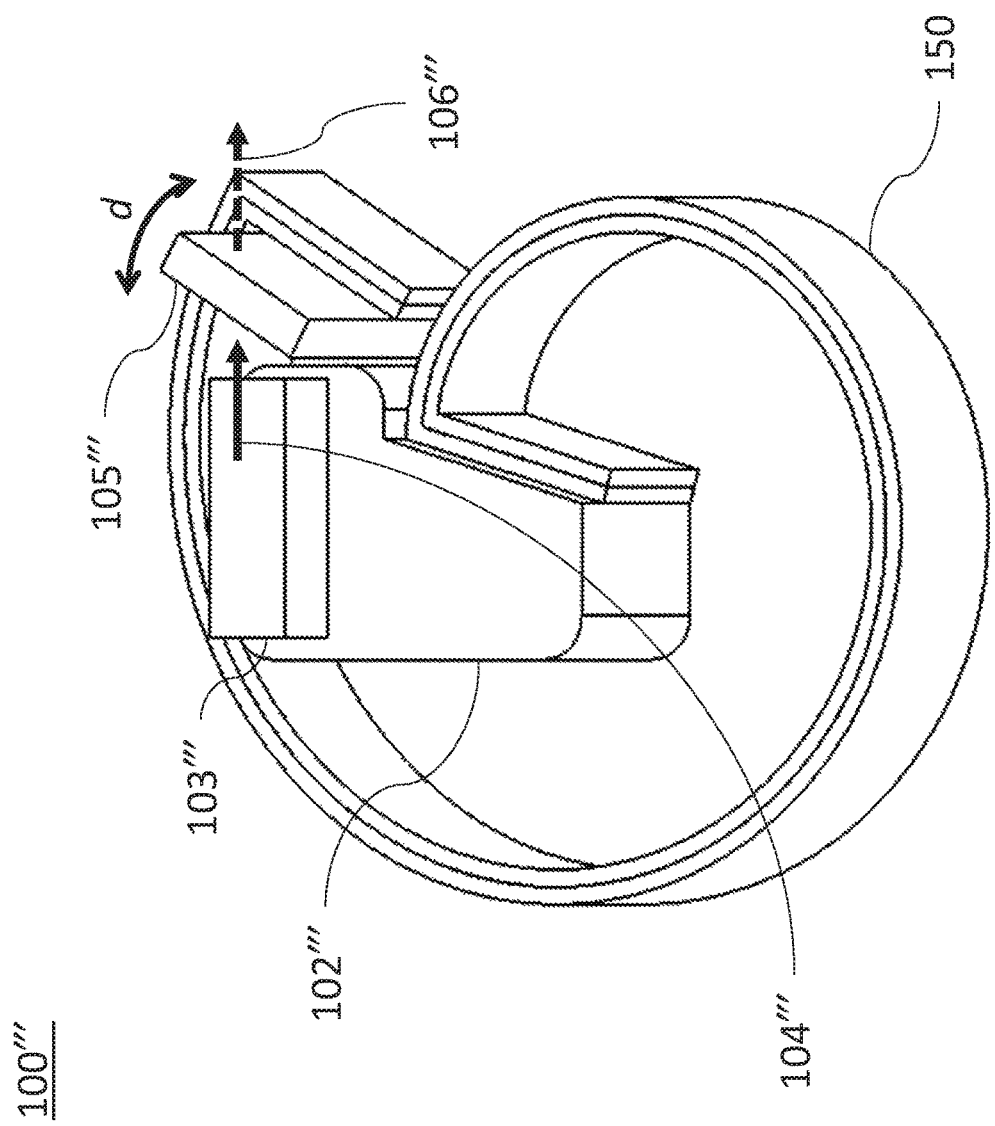
FIG. 25 is a schematic view of the apparatus of FIG. 8, further including a bi-material strip according to another embodiment.

FIG. 24 indicates that an exemplary dependence of angle of incidence $\varphi$ on temperature T of $(-0.5$ nm/° C.$)/(-3.2$ nm/°$)=0.156$°/° C. would be desirable in the case described. FIG. 25 is a schematic view of passively wavelength-stabilized broadband light source apparatus 100''' including bi-material strip 150 that is attached and in thermal contact with mount 102'''. Bi-material strip 150 includes two materials with dissimilar coefficients of thermal expansion for inducing a temperature-dependent deflection as known in the art. Bi-material strip 150 is shown in FIG. 25 to have the form of a spiral. Alternatively bi-material strip 150 may have a different form, for example a beam.

Filter 105''' is mechanically attached to the other end of bi-material strip 150 such that the emission light 104''' from source 103''' is aimed to transmit through filter 105''', resulting in output light 106'''. Bi-material strip 150 is designed to position filter 105''' such that emission light 104''' is incident upon filter 105''' at a 30° angle at temperature $T_0$, for example 25° C., corresponding to a low limit of the operating range of wavelength-stabilized light source apparatus 100'''. It is known in the art that such a bi-material strip with the form of a spiral will exhibit a clockwise angular deflection of d degrees with an increase in temperature from $T_0$ to $T_1$ according to Eq. (7):

$$d = \frac{360\alpha(T_1 - T_0)\ell}{\pi s}$$

where α is the specific deflection of the bi-material strip, l is the length of the bi-material strip, and s is the thickness of the bi-material strip. Preferably the specific deflection a is large and/or the thickness s is small so that l can be reasonably small for a desired value of d to achieve a compact design. For example, the bi-material strip KANTHAL™ 200 is known to have a relatively high specific deflection $\alpha = 20.8 \times 10^{-6} K^{-1}$, so a strip with thickness s=0.4 mm would require a strip length l of only 26.2 mm to achieve an angular deflection rate of 0.156°/° C., which is the desired dependence for the example described.

Figure 26:
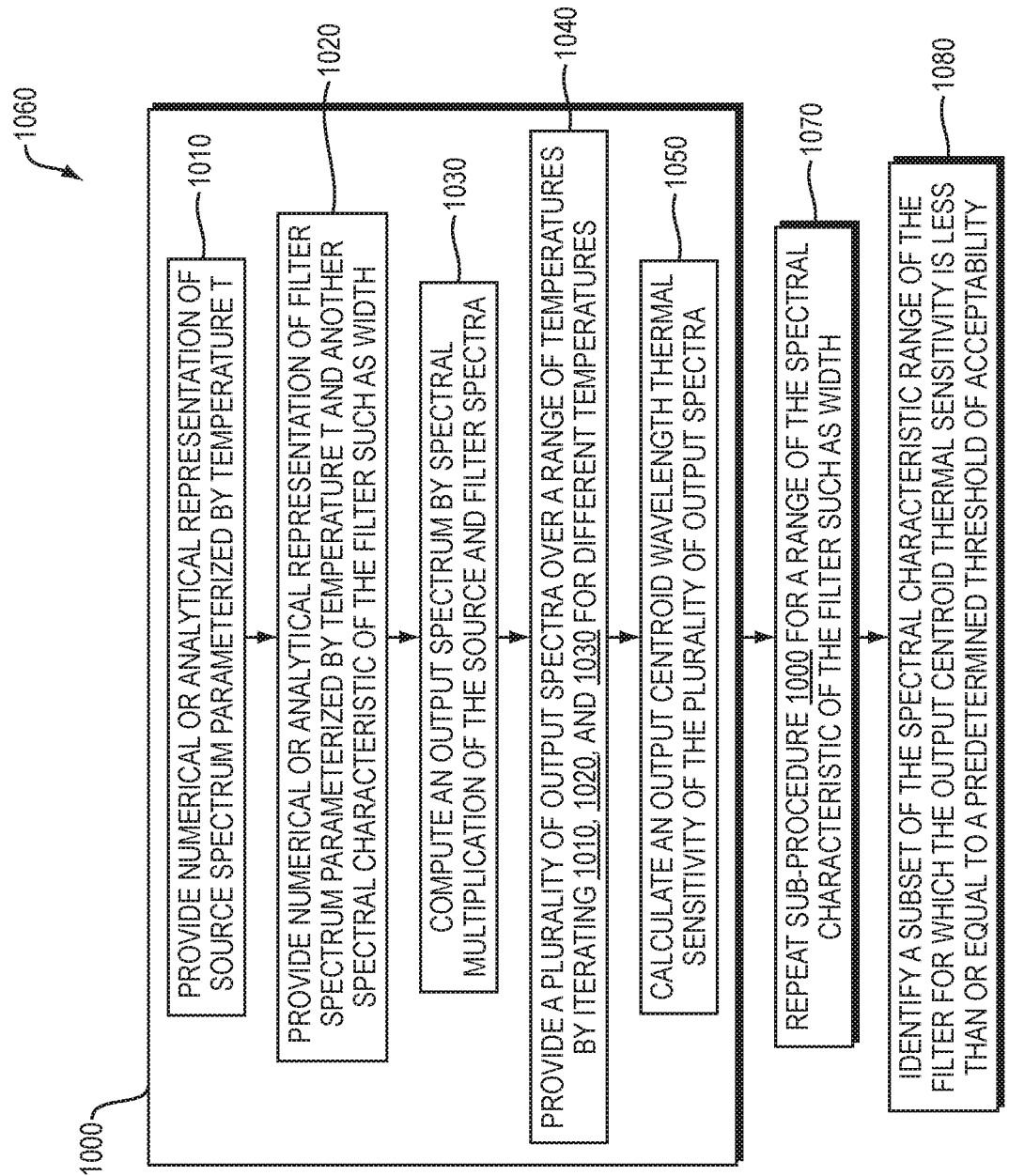
FIG. 26 is a flow diagram illustrating a method that can be used in connection with embodiments to configure broadband optical filters.

As described hereinabove, embodiment methods can include configuring a broadband optical filter to minimize the thermal sensitivity of the output centroid wavelength (variation of an output wavelength spectrum centroid with temperature), or maximize output power, or both, for a broadband optical light source apparatus. Modeling and computation techniques can assist in configuring the optical filter parameters to be optimum. FIG. 26 illustrates this general principle.

FIG. 26 is a flow diagram illustrating an embodiment procedure 1060 that can be used in configuring the broadband optical filter to produce the output wavelength spectral features described herein. At a sub-procedure 1000, a particular spectral characteristic of the filter, such as spectral shape or spectral width, is selected for a multi-temperature analysis of the resulting output spectrum of an embodiment broadband source. In particular, at 1010, a numerical or analytical representation of the source wavelength spectrum is provided for a temperature T. At 1020, a numerical or analytical representation of the filter wavelength spectrum at the temperature T and the value selected for the other spectral characteristic of the filter, such as width, is provided. At 1030, an output wavelength spectrum is computed by spectral multiplication of the source and filter wavelength spectra. At 1040, a plurality of output wavelength spectra over a range of temperatures is provided by repeating 1010, 1020, and 1030 for different temperatures. At 1050, a thermal sensitivity of the output centroid wavelength is calculated based on the plurality of output spectra determined for the different temperatures.

At 1070, the sub-procedure 1000 is repeated for a range of the spectral characteristic of the filter, such as width. At 1080, a subset of the spectral characteristic range of the filter is identified for which the thermal sensitivity of the output centroid wavelength is less than or equal to a predetermined threshold of acceptability.

As will be understood by those skilled in the art, in view of the disclosure herein, the procedure 1060 may also be repeated for different spectral characteristics, such as different spectral filtering functions or different thermal sensitivities of the filter wavelength spectrum, which can be provided by filter design. Furthermore, it will be understood that the procedure 1060 illustrated in FIG. 26 can be modified in various ways, including providing nested loops for iteration of the procedure over multiple filter characteristics.

Figure 27:
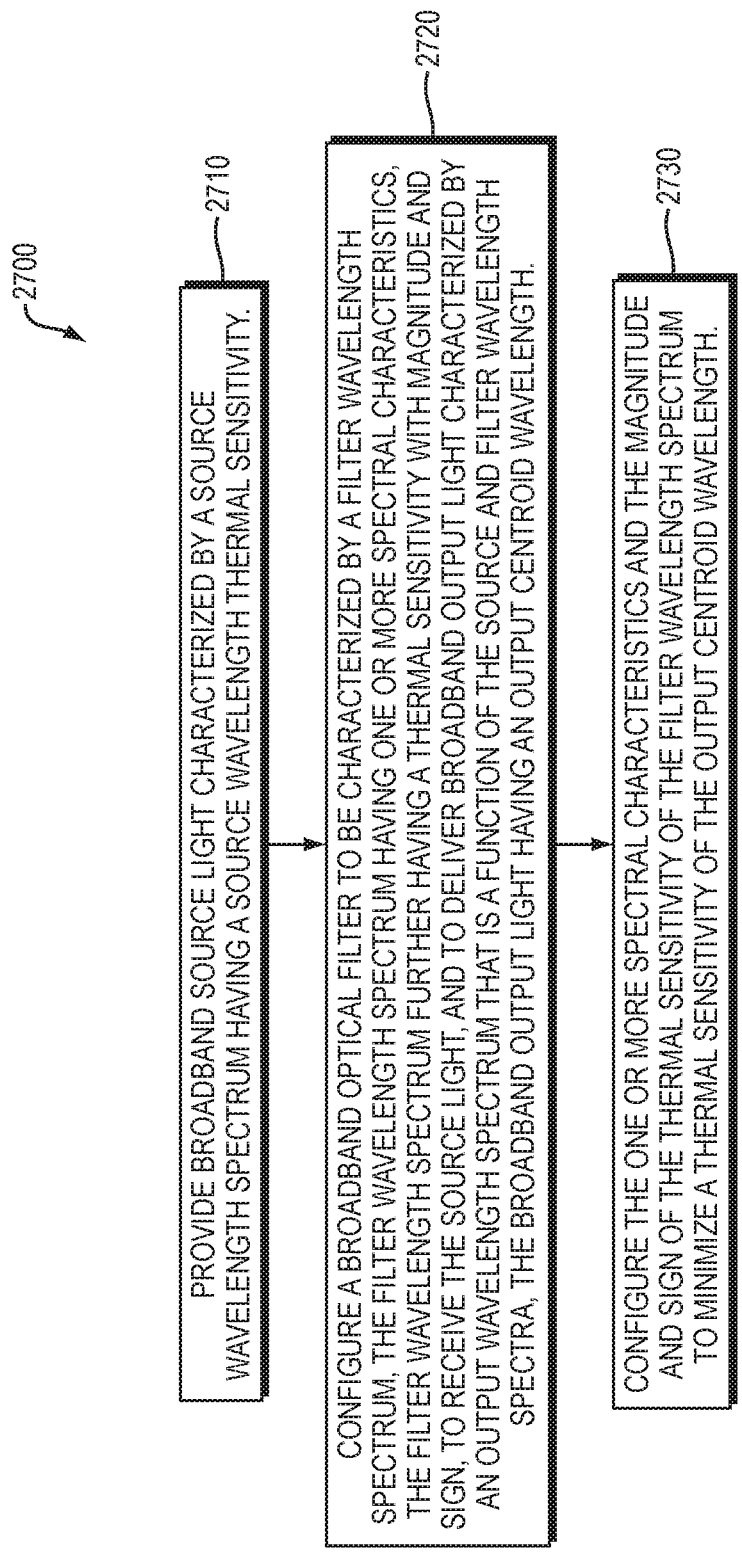
FIG. 27 is a flow diagram illustrating an embodiment method for optimizing a broadband light source.

FIG. 27 is a flow diagram illustrating a procedure 2700 for optimizing broadband light, according to an embodiment method. At 2710, a broadband light source or broadband light having a source wavelength spectrum characterized by a source centroid wavelength with a thermal sensitivity is provided. At 2720, a broadband optical filter is configured to be characterized by a filter wavelength spectrum having one or more spectral characteristics, the filter wavelength spectrum further having a thermal sensitivity with magnitude and sign, to receive the source light, and to deliver broadband output light characterized by an output wavelength spectrum that is a function of the source and filter wavelength spectra, the broadband output light having an output centroid wavelength. At 2730, the one or more spectral characteristics and the magnitude and sign of the thermal sensitivity of the filter wavelength spectrum are configured to minimize a thermal sensitivity of the output centroid wavelength.

An alternative embodiment method includes optimizing broadband light by filtering broadband source light having a source wavelength spectrum characterized by a source centroid wavelength with a thermal sensitivity. The method also includes filtering the broadband source light using a filter wavelength spectrum having one or more spectral characteristics and a thermal sensitivity with magnitude and sign. The source light is received and filtered. Filtering further includes filtering with the one or more spectral characteristics and the magnitude and sign of the thermal sensitivity of the filter wavelength spectrum to minimize a thermal sensitivity of an output centroid wavelength of an output wavelength spectrum of broadband output light that is a function of the source and filter wavelength spectra.

As also described hereinabove, in connection with any of the methods described above, the output wavelength spectrum can have an output centroid wavelength, and the method can further include configuring at least one of the spectral characteristics of the filter wavelength spectrum and the thermal sensitivity of the filter wavelength spectrum such that a variation of the output centroid wavelength with ambient temperature is minimized. The method may further include configuring the broadband optical filter to minimize the output centroid wavelength variation with temperature to within 10 ppm over an ambient temperature range of 10° C.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength to within ±50 parts per million per degree C. (ppm/° C.), ±5 ppm/° C., ±0.5 ppm/° C., or ±0.2 ppm/° C. Achieving these thermal sensitivities may be accomplished by using the iterative procedure illustrated in FIG. 26, for example, or similar procedures that iterate over filter parameter space, until thermal sensitivity of the output centroid wavelength is minimized to the desired degree.

Configuring the one or more spectral characteristics and the magnitude and sign of the thermal sensitivity of the filter wavelength spectrum to minimize a thermal sensitivity of the output centroid wavelength may include configuring the spectral characteristics and the magnitude and sign of the thermal sensitivity of the filter wavelength spectrum to minimize the thermal sensitivity of the output centroid wavelength over a temperature range of 0.1° C., 1° C., 10° C., or 100° C. Achieving these thermal sensitivity ranges may be accomplished by using the iterative procedure illustrated in FIG. 26, for example, or similar procedures that iterate over filter parameter space, until a desired thermal sensitivity of the output centroid wavelength is determined by simulation or measurement to be minimized to the desired degree over the desired range of ambient temperatures.

The methods may further include configuring the one or more spectral characteristics and the magnitude and sign of the thermal sensitivity of the filter wavelength spectrum to maximize a relative integrated output power of the broadband output light, including maximizing the relative integrated output power of the broadband output light to at least 0.3, 0.6, or 0.9. The method may further include configuring the sign of the thermal sensitivity of the filter wavelength spectrum to be negative.

Configuring or filtering using the one or more spectral characteristics and the magnitude and sign of the thermal sensitivity of the filter wavelength spectrum may include configuring or filtering using the spectral characteristics and the magnitude and sign of the thermal sensitivity of the filter wavelength spectrum of an asymmetric Mach-Zehnder interferometer structure or a waveguide Bragg grating structure. The methods can also include configuring or filtering using a waveguide Bragg grating structure to include at least one of a core and a cladding including TiO2.

Configuring or filtering using the one or more spectral characteristics and the magnitude and sign of the thermal sensitivity of the filter wavelength spectrum may include using an interference filter mechanically attached to a bi-material strip to which a broadband light source providing the source light is also attached. Configuring or filtering using the sign of the thermal sensitivity of the filter wavelength spectrum may also include configuring or filtering using an effective negative sign of the thermal sensitivity of the filter wavelength spectrum due to relative angular displacement of the light source and the interference filter as a function of ambient temperature.

Configuring or filtering using the one or more spectral characteristics and the magnitude and sign of the thermal sensitivity of the filter wavelength spectrum filter wavelength spectrum may include using two or more sub-filters. The filter wavelength spectrum thermal sensitivity can be negative in sign, and using the two or more sub-filters can include using sub-filters with respective wavelength thermal sub-sensitivities, at least one of the sub-sensitivities being positive in sign. Configuring or filtering using the one or more spectral characteristics of the filter wavelength spectrum can include configuring the filter or using the filter to deliver broadband output light with the output wavelength spectrum having a width of at least 5 nm. The width may be measured or calculated using the FWHM method.

Providing the broadband source light can include providing light from at least one of an SLD, a REDSLS, and an LED.

In yet another embodiment, a method of optimizing a FOG includes optimizing broadband light according to any embodiment method disclosed herein or using any embodiment apparatus disclosed herein. An example FOG incorporating the embodiment broadband light source apparatus of FIG. 8 is described hereinafter in connection with FIG. 28. As described in connection with FIG. 26, and as will be understood in view of the additional disclosure provided herein, the procedure 1060 in FIG. 26 is an example illustrating one method for determining filter parameters for broadband optical filters in minimizing thermal sensitivity of the output centroid wavelength to stabilize a broadband light source with respect to ambient temperature or deliver broadband light that is stabilized with respect to ambient temperature.

Figure 28:
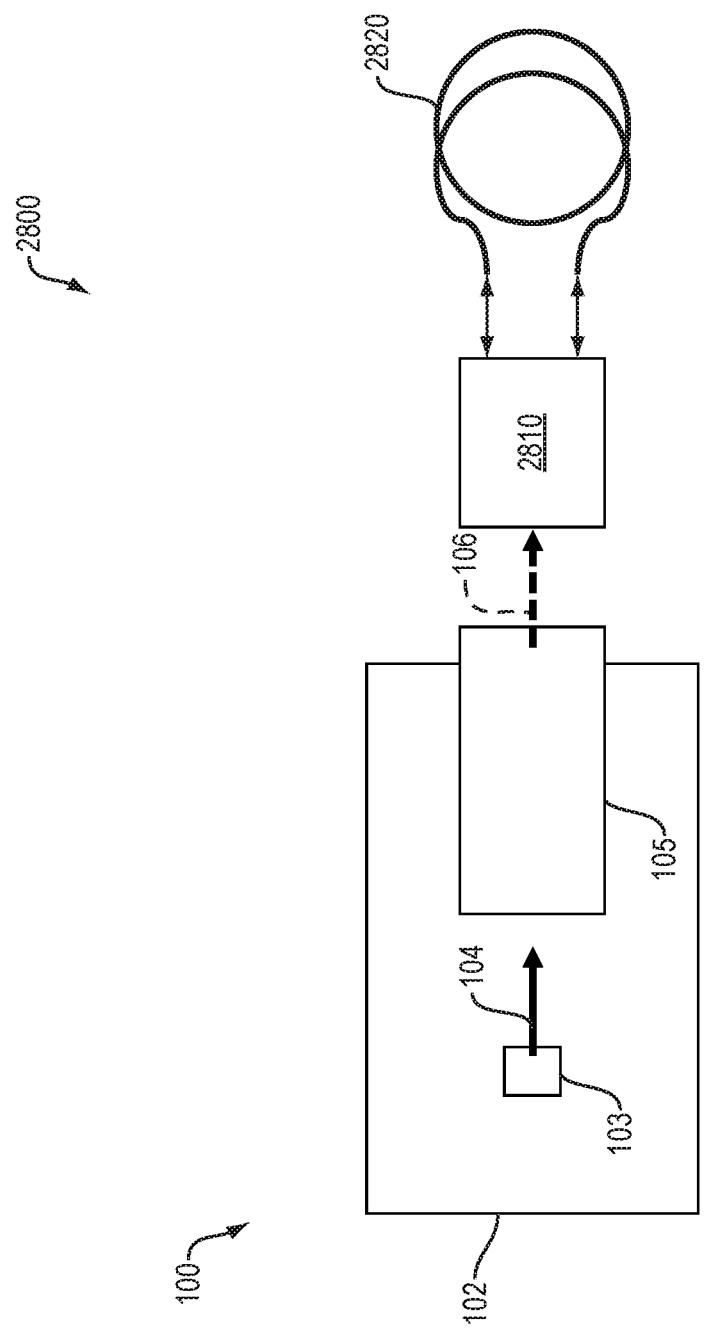
FIG. 28 is a schematic diagram illustrating a fiber optic gyroscope (FOG) that incorporates the broadband light source of FIG. 8.

FIG. 28 is a schematic diagram illustrating an embodiment FOG 2800 that incorporates the broadband light source apparatus 100 illustrated in FIG. 8. The FOG 2800 includes a coupler 2810 that is configured to couple the broadband output light from the apparatus 100 into a coil 2820 of the FOG, which is used to form a Sagnac interferometer to sense rotation with high precision that depends upon the thermally stabilized output centroid wavelength of the embodiment broadband light source apparatus 100. Embodiment broadband light sources, such as the light source apparatus 100, can be passively filter-stabilized to the example tolerances described above, for example, for enhanced precision of rotational measurement.

The invention has been described in detail with particular reference to certain preferred embodiments thereof, but it will be understood that variations and modifications can be effected within the scope of the invention as described above by a person of ordinary skill in the art without departing from the scope of the invention.

While this invention has been particularly shown and described with references to example embodiments thereof, it will be understood by those skilled in the art that various changes in form and details may be made therein without departing from the scope of the invention encompassed by the appended claims.

The teachings of all patents, published applications and references cited herein are incorporated by reference in their entirety.

What is claimed is:

1. A broadband light source apparatus comprising:
a broadband light source configured to provide broadband source light characterized by a source wavelength spectrum having a source centroid wavelength with a thermal sensitivity; and
a broadband optical filter characterized by a filter wavelength spectrum, the filter wavelength spectrum having one or more spectral characteristics, the filter wavelength spectrum further having a thermal sensitivity with magnitude and sign, the broadband optical filter configured to receive the source light and to deliver broadband output light characterized by an output wavelength spectrum that is a function of the source and filter wavelength spectra,
the broadband output light having an output centroid wavelength, the sign of the thermal sensitivity of the filter wavelength spectrum being opposite a sign of the thermal sensitivity of the source centroid wavelength, and the one or more spectral characteristics and the magnitude and sign of the thermal sensitivity of the filter wavelength spectrum configured to minimize a thermal sensitivity of the output centroid wavelength,
wherein the broadband optical filter is an interference filter, and wherein the broadband light source and the interference filter are mechanically attached to a bi-material strip, and wherein the sign of the thermal sensitivity of the filter wavelength spectrum is an effective negative sign of the thermal sensitivity of the filter wavelength spectrum due to relative angular displacement of the broadband light source and the broadband optical filter as a function of ambient temperature.

2. The apparatus of claim 1, wherein the one or more spectral characteristics and the magnitude and sign of the thermal sensitivity of the filter wavelength spectrum are further configured to minimize the thermal sensitivity of the output centroid wavelength to within ±5 ppm/° C.

3. The apparatus of claim 2, wherein the one or more spectral characteristics and the magnitude and sign of the thermal sensitivity of the filter wavelength spectrum are further configured to minimize the thermal sensitivity of the output centroid wavelength to within ±0.5 ppm/° C.

4. The apparatus of claim 3, wherein the one or more spectral characteristics and the magnitude and sign of the thermal sensitivity of the filter wavelength spectrum are further configured to minimize the thermal sensitivity of the output centroid wavelength to within ±0.2 ppm/° C.

5. The apparatus of claim 1, wherein the one or more spectral characteristics and the magnitude and sign of the thermal sensitivity of the filter wavelength spectrum are further configured to minimize the thermal sensitivity of the output centroid wavelength over a temperature range of 10° C.

6. The apparatus of claim 1, wherein the one or more spectral characteristics and the magnitude and sign of the thermal sensitivity of the filter wavelength spectrum are configured such that a relative integrated output power of the broadband output light is maximized.

7. A fiber-optic gyroscope (FOG) including the broadband light source apparatus claim 1, the FOG further including a coil of optical fiber and an optical coupling configured to couple the broadband output light into the coil of optical fiber.

8. A method for optimizing broadband light, the method comprising:
providing broadband source light characterized by a source wavelength spectrum having a source centroid wavelength thermal sensitivity;
configuring a broadband optical filter to be characterized by a filter wavelength spectrum, the filter wavelength spectrum having one or more spectral characteristics, the filter wavelength spectrum further having a thermal sensitivity with magnitude and sign, to receive the source light, and to deliver broadband output light characterized by an output wavelength spectrum that is a function of the source and filter wavelength spectra, the broadband output light having an output centroid wavelength, the sign of the thermal sensitivity of the filter wavelength spectrum being opposite a sign of the thermal sensitivity of the source centroid wavelength; and
configuring the one or more spectral characteristics and the magnitude and sign of the thermal sensitivity of the filter wavelength spectrum to minimize a thermal sensitivity of the output centroid wavelength,
wherein configuring the one or more spectral characteristics and the magnitude and sign of the thermal sensitivity of the filter wavelength spectrum includes using an interference filter mechanically attached to a bi-material strip to which a broadband light source providing the source light is also attached, and wherein configuring the sign of the thermal sensitivity of the filter wavelength spectrum also includes configuring an effective negative sign of the thermal sensitivity of the filter wavelength spectrum due to relative angular displacement of the light source and the broadband optical filter as a function of ambient temperature.

9. The method of claim 8, wherein configuring the one or more spectral characteristics and the magnitude and sign of the thermal sensitivity of the filter wavelength spectrum to minimize a thermal sensitivity of the output centroid wavelength includes configuring the spectral characteristics and the magnitude and sign of the thermal sensitivity of the filter wavelength spectrum to minimize the thermal sensitivity of the output centroid wavelength to within ±5 ppm/° C.

10. The method of claim 9, wherein configuring the one or more spectral characteristics and the magnitude and sign of the thermal sensitivity of the filter wavelength spectrum to minimize a thermal sensitivity of the output centroid wavelength includes configuring the spectral characteristics and the magnitude and sign of the thermal sensitivity of the filter wavelength spectrum to minimize the thermal sensitivity of the output centroid wavelength to within ±0.5 ppm/° C.

11. The method of claim 10, wherein configuring the one or more spectral characteristics and the magnitude and sign of the thermal sensitivity of the filter wavelength spectrum to minimize a thermal sensitivity of the output centroid wavelength includes configuring the spectral characteristics and the magnitude and sign of the thermal sensitivity of the filter wavelength spectrum to minimize the thermal sensitivity of the output centroid wavelength to within ±0.2 ppm/° C.

12. The method of claim 8, wherein configuring the one or more spectral characteristics and the magnitude and sign of the thermal sensitivity of the filter wavelength spectrum to minimize a thermal sensitivity of the output centroid wavelength includes configuring the spectral characteristics and the magnitude and sign of the thermal sensitivity of the filter wavelength spectrum to minimize the thermal sensitivity of the output centroid wavelength over a temperature range of 10° C.

13. The method of claim 8, further including configuring the one or more spectral characteristics and the magnitude and sign of the thermal sensitivity of the filter wavelength spectrum to maximize a relative integrated output power of the broadband output light.

* * * * *